US008894398B2

(12) United States Patent
Donohoo et al.

(10) Patent No.: US 8,894,398 B2
(45) Date of Patent: Nov. 25, 2014

(54) MODULAR PLASTICS EXTRUSION APPARATUS

(75) Inventors: Mark K. Donohoo, Calvert City, KY (US); Terry B. McGregor, Benton, KY (US); Michael L. Walker, Paducah, KY (US); Michael A. Meredith, Paducah, KY (US); Steven W. Spahn, Evansville, IN (US); Jeffery H. West, Newburgh, IN (US)

(73) Assignee: Apex Business Holdings, L.P., Calvert City, KY (US)

( * ) Notice: Subject to any disclaimer, the term of this patent is extended or adjusted under 35 U.S.C. 154(b) by 203 days.

(21) Appl. No.: 13/554,594

(22) Filed: Jul. 20, 2012

(65) Prior Publication Data

US 2014/0023743 A1    Jan. 23, 2014

(51) Int. Cl.
*B29C 47/10*    (2006.01)
*B29C 47/92*    (2006.01)
*B29C 47/08*    (2006.01)

(52) U.S. Cl.
CPC ............. *B29C 47/10* (2013.01); *B29C 47/1009* (2013.01); *B29C 47/92* (2013.01); *B29C 47/0806* (2013.01); *B29C 2947/92104* (2013.01); *B29C 2947/92333* (2013.01); *B29C 2947/926* (2013.01); *B29C 2947/92828* (2013.01)
USPC .... 425/88; 425/192 R; 425/131.1; 425/376.1; 425/462

(58) Field of Classification Search
USPC ...... 425/88, 192 R, 131.1, 132, 133.5, 376.1, 425/461, 462
See application file for complete search history.

(56) References Cited

U.S. PATENT DOCUMENTS

| 3,690,518 | A | | 9/1972 | Baker et al. |
|---|---|---|---|---|
| 4,094,122 | A | | 6/1978 | Edmunds, Jr. |
| 4,663,103 | A | * | 5/1987 | McCullough et al. ........ 264/40.4 |
| 4,749,279 | A | | 6/1988 | Csonger |
| 5,126,088 | A | | 6/1992 | Andres |
| 5,173,230 | A | * | 12/1992 | Colombo ...................... 264/102 |
| 5,437,826 | A | * | 8/1995 | Martinello et al. ........... 264/102 |
| 5,486,327 | A | | 1/1996 | Bemis et al. |
| 5,487,602 | A | | 1/1996 | Valsamis et al. |
| 5,614,227 | A | | 3/1997 | Yarbrough |
| 5,723,082 | A | | 3/1998 | Mizuguchi et al. |
| 5,951,159 | A | | 9/1999 | Schobert-Csongor et al. |
| 6,098,847 | A | | 8/2000 | Vollmar |
| 6,166,169 | A | | 12/2000 | Fritz et al. |
| 7,513,766 | B2 | | 4/2009 | Peavey et al. |
| 2005/0087906 | A1 | * | 4/2005 | Caretta et al. ................. 264/211 |

* cited by examiner

*Primary Examiner* — Yogendra Gupta
*Assistant Examiner* — Joseph Leyson
(74) *Attorney, Agent, or Firm* — Joseph M. Rolnicki; Evans & Dixon, LLC

(57) ABSTRACT

A modular plastic extrusion apparatus has several component parts. The design of the integration of those parts into a modular extrusion system is unique. Said design allows for rapid assembly, testing, disassembly and placement into production of extruded plastics. This modular plastic extrusion apparatus has several components with replaceable counterparts that, after one product line of a particular color has been extruded by the apparatus, enable the component parts used to produce the particular color extrusion to be removed from the apparatus and replaced with their clean counterparts to continue producing an extrusion product line of a different color while the removed components are cleaned off line.

28 Claims, 26 Drawing Sheets

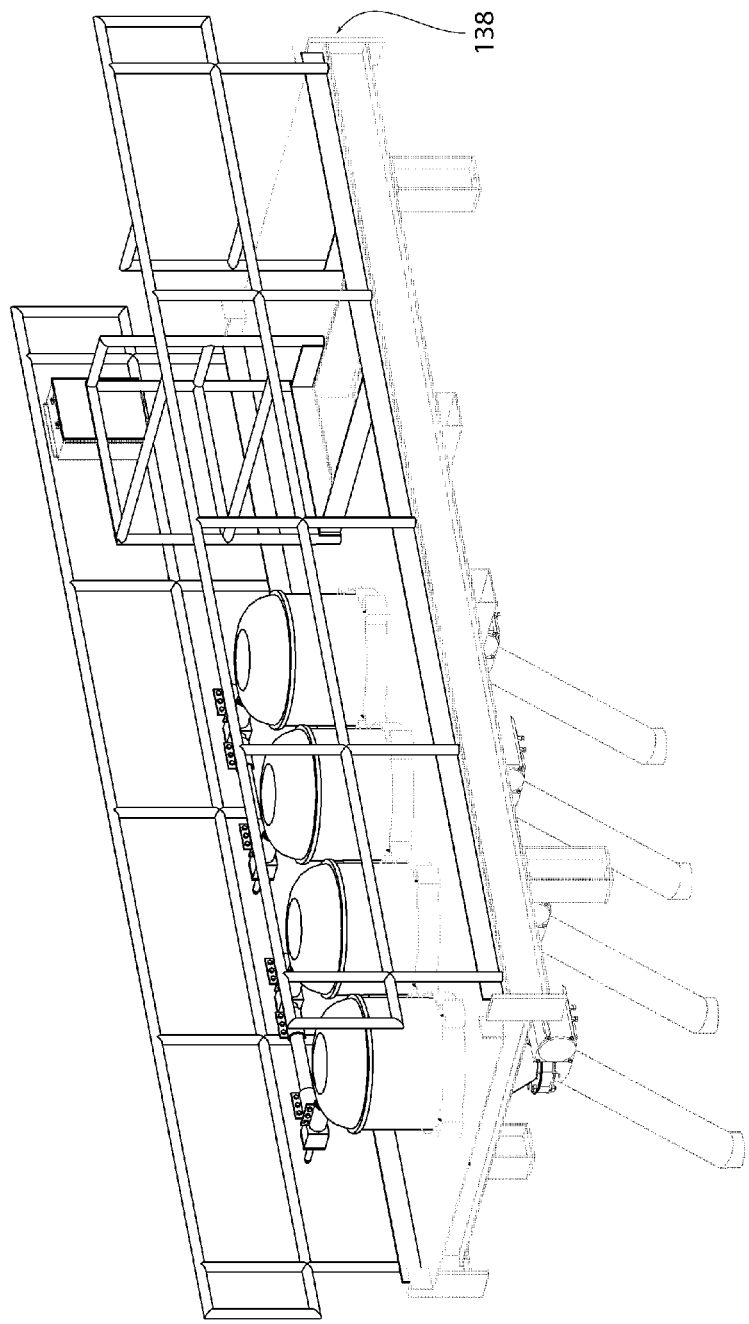

MODULAR PLASTICS EXTRUSION APPARATUS

FIELD

The present invention is a plastics extrusion apparatus that has a unique modular design that enables the apparatus to be completely assembled and tested prior to shipment, disassembled and placed into standard shipping containers, shipped to production site, reassembled on site and making product in less than 3 weeks after arrival on site. Once in production, this apparatus allows change over from the production of one plastic extrusion stream having a particular attribute, such as color, to another plastic extrusion stream of a different color with a minimum amount of down time of the apparatus. More specifically, the present invention is a modular plastic extrusion apparatus which is easily assembled, tested, disassembled, placed into standard shipping containers, shipped to production site, reassembled and placed into production quickly and easily. The present invention has several components with replacement counterparts that, after one product line of a particular color has been extruded by the apparatus, enable the components used to produce the particular color extrusion to be removed from the apparatus and replaced with their clean counterparts to continue producing an extrusion product line of a different color while the removed components are cleaned off line.

BACKGROUND

Plastics extrusion is a high volume manufacturing process in which solid plastic material (typically called a resin), in the form of beads or pellets, is continuously fed into a heated tubular chamber or barrel and is moved through the barrel by a drive screw. As the resin is moved through the barrel by the drive screw it is compressed, melted, and forced out of the end of barrel at a steady rate through a die. As the melted resin is pushed through the die, it is formed into a continuous profile having a cross section configuration that matches the die pattern. The melted resin exiting the die is immediately cooled resulting in the re-solidification of the plastic material in the continuous profile.

Plastic extrusion produces products such as pipe/tubing, weather stripping, fence, deck railing, window frames, vinyl siding, plastic wrap, shrink wrap, and many more. Depending on the end product, the extrusion may be a blown into film, wound, spun, folded, rolled, pelletized, plus a number of other possibilities.

The typical plastic extrusion machine includes a heated barrel and a drive screw that extends through an interior bore of the barrel. The screw is driven in rotation in the barrel by a gear transmission, which in turn is powered by a motor. A hopper is attached on top of a proximal end of the barrel and an extruder die is attached over the distal end of the barrel.

In the extrusion process, raw thermoplastic material in the form of small beads or resin is gravity fed into the hopper. Additives such as color additives, film conditioning additives, UV inhibitors can be mixed into the resin prior to the resin arriving at the hopper.

The thermoplastic beads and any additives drop from the hopper, through an opening near the proximal end of the barrel and into the barrel interior bore where they come into contact with the rotating screw. As the screw rotates, it slowly drags the pellets and additives forward through the barrel. The heat from the friction of the screw rotating inside the barrel, together with the external heating of the barrel melts the plastic as it moves forward in the barrel. Further travel of the resin melt through the barrel by the screw rotation thoroughly mixes the melt.

The melt is then extruded into the die. The die gives the final product its profile and is designed so that the plastic melt evenly flows from the cylindrical profile of the interior of the barrel, to the product's profile shape.

The product extruded from the die solidifies quickly. Depending on the end product, the solidification of the product may be achieved by immersion in cooling water, air cooling, or contact with chill roles. Once solid, the product material can then be wound, spun, cut into defined lengths or pelletized depending upon its intended end use.

Most plastic extrusion systems are built to be stationary systems. The present invention is a modular design allowing simple assembly for testing prior to shipment; simple disassembly and placement into standard shipping containers; shipped to site and simple reassembly and placement into production in less than 3 weeks after arrival on site. The present invention is unique in this manner and allows plastics producers to then easily move this system to other locations where plastics production is desired.

Many plastic extrusion processes involve an extruded product having a particular color desired by the end user of the product. Extruding a product of a particular color is accomplished by mixing different colored pellets in certain proportions prior to the pellets being delivered to the hopper of the extrusion machine, or mixing different colors of pellets in certain proportions in addition to pigment additives that are delivered to the hopper to achieve the desired color of the final extruded product.

A downside of producing an extruded product of a particular color is that once the production line of the particular color product is complete, many of the component parts of the extrusion machine must be thoroughly cleaned before beginning another production line of a different color product in order to prevent the color contamination of the subsequent product line. Extrusion machines that typically produce extruded products of different colors are disadvantaged in that, due to the need to thoroughly clean the component parts of the machines between production lines of different extruded products, there is a significant down time of the machines and an associated decrease in the production yield of the machines.

Additionally, because it typically takes between 30 and 60 minutes to thoroughly clean the component parts of an extrusion machine, any short cuts taken to reduce the amount of time in cleaning the machine could result in color contamination of the extruded products from one production line to the next.

What is needed to overcome these disadvantages associated with the typical plastic extrusion machine is a plastic extrusion apparatus that can be quickly changed over from producing an extruded product of one color to an extruded product of another color while reducing or eliminating the possibility of color contamination from the one product to the other product.

SUMMARY

The plastic extrusion apparatus of the present invention overcomes the disadvantages associated with prior art extrusion machines. The unique modular design allows for easy assembly for testing, disassembly and placement into standard shipping containers, reassembly at production site for rapid placement into production of extruded product. The unique construction of the apparatus of the invention enables it to produce an extruded product of one color, and then to be quickly changed over to produce an extruded product of a different color without the significant down time associated with prior art extrusion machines, while also reducing or eliminating the possibility of color contamination from one extrusion production line to the next extrusion production line.

The plastic extrusion apparatus of the invention is comprised of many of the basic component parts found in prior art extrusion machines. However, the integration of those component parts into a modular extrusion system with the aforementioned assembly, disassembly, shipping and reassembly attributes is unique. Also, in the apparatus of the invention many of the component parts have been modified to enable the apparatus of the invention to be quickly changed over from one color production line to another color production line.

For example, the apparatus of the invention includes a heated barrel, a drive screw extending through the barrel, a motive source rotating the drive screw, a die head at a distal end of the barrel, and a feed throat hopper at the proximal end of the barrel. However, in the apparatus of the invention the feed throat hopper is one of at least two separate and substantially identical feed throat hoppers that are interchangeably and removably attachable to the barrel. Thus, rather than having to thoroughly clean one feed throat hopper used in an extrusion production run of a particular color before beginning a further production run of a different color, the first feed throat hopper can be removed from the barrel and quickly replaced with the second feed throat hopper to quickly begin the next production run while the first feed throat hopper is cleaned off line.

In addition, the apparatus of the invention is provided with at least two separate and substantially identical gravimetric feeders that each feed a blend of thermoplastic pellets and other additives to the feed throat hopper. Each of the gravimetric feeders is interchangeably and removably connectable to a lift mechanism that is adjacent the feed throat hopper. Thus, rather than having to thoroughly clean one gravimetric feeder used in a production run of one extrusion product of a particular color before beginning a further production run of a different color, the first gravimetric feeder can be removed from its connection to the lift mechanism adjacent the feed throat hopper and replaced with the second gravimetric feeder to quickly commence a second production run of an extruded product of a different color while the first gravimetric feeder is cleaned off line.

Still further, the apparatus of the invention is provided with at least two separate and substantially identical bowl containers that each deliver a mix of thermoplastic pellets to the gravimetric feeder being used with the feed throat hopper. Each of the bowl containers is interchangeably and removably received in a docking station having a discharge tube that communicates with the gravimetric feeder. When a production run of one extrusion product of a particular color is completed, the first bowl container providing the thermoplastic pellets for that production run can be quickly removed from the docking station and replaced with the second bowl container having the thermoplastic pellets for the second production run. The removed first bowl container can then be cleaned off line.

Additionally, the apparatus of the invention is constructed in a manner where several component parts of the apparatus are assembled as discreet modules that can be broken down and fit into a standard shipping container for shipping of the apparatus. The modules can then be shipped to a particular location where they can be unloaded from the shipping containers and quickly assembled to produced the plastic extrusion apparatus of the invention.

Further features of the invention are set forth in the following detailed description of the apparatus and in the drawing figures.

BRIEF DESCRIPTION OF THE DRAWINGS

FIG. 26 is a perspective view of a module of the apparatus removed from the second upper level of the apparatus shown in FIG. 25.

DESCRIPTION

Figure 1:
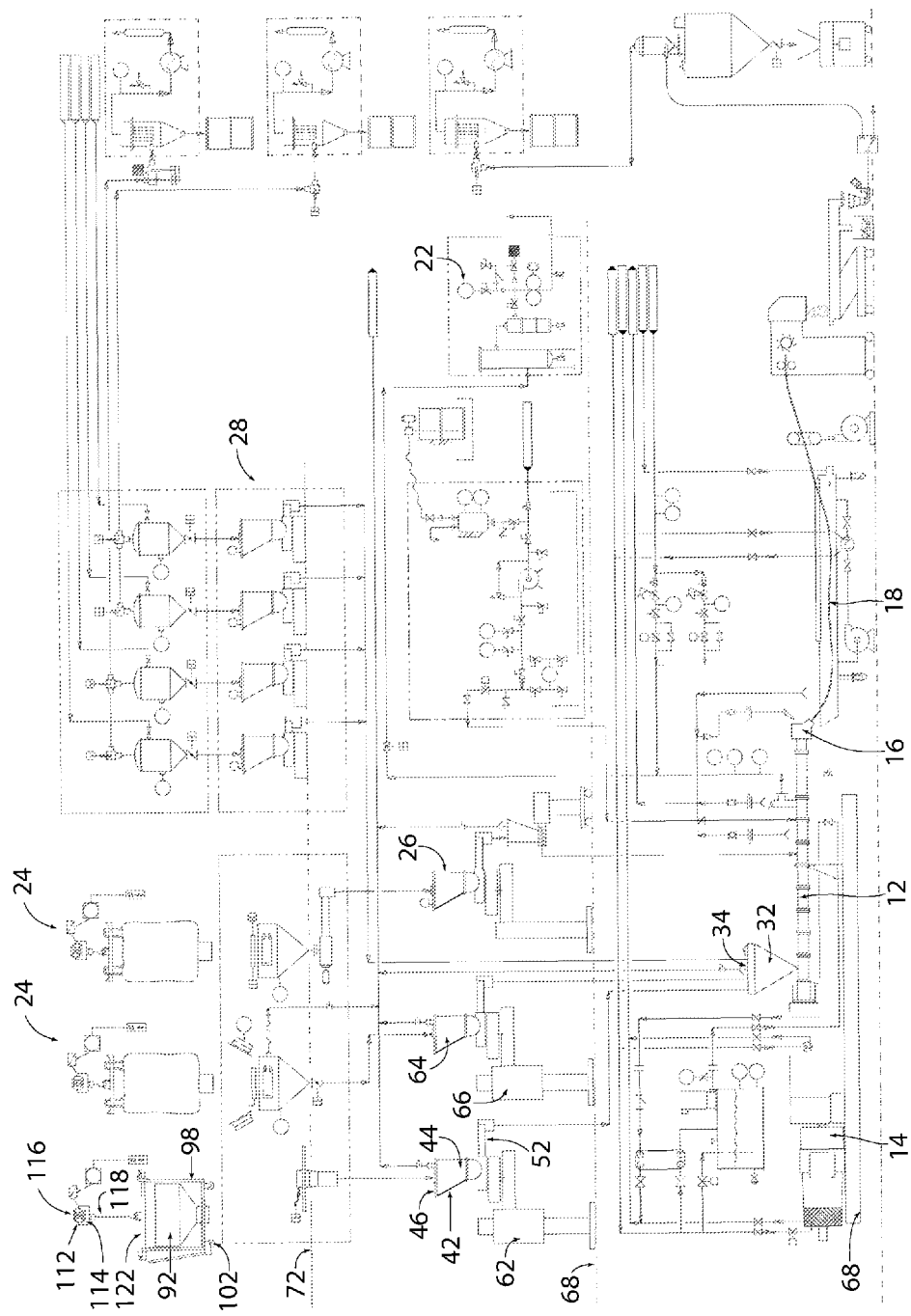
FIG. 1 is a schematic representation of the plastics extrusion apparatus of the invention.

FIG. 1 is a schematic representation of the plastics extrusion apparatus of the invention. From FIG. 1 it can be seen that the apparatus of the invention makes use of several conventional component parts found in many extrusion apparatus. For example, the apparatus of the invention includes an extrusion barrel proximal end containing a drive screw, a motive source 14 that is operatively connected with the barrel 12 and rotates the drive screw in the barrel in response to the operation of the motive source, a die head 16 connected to the barrel distal end, as well as many other component parts such as a water bath 18, a vacuum pump system 22, bulk bag unloaders 24, a fiberglass side feeder 26 and additional pellet feeders 28.

Although the extrusion apparatus of the invention employs several component parts that can be found in conventional plastics extrusion apparatus, the apparatus of the invention is unique in that many of the component parts of the apparatus have been modified to enable the apparatus to be quickly changed over from one color production line to another color production line.

Figure 6:
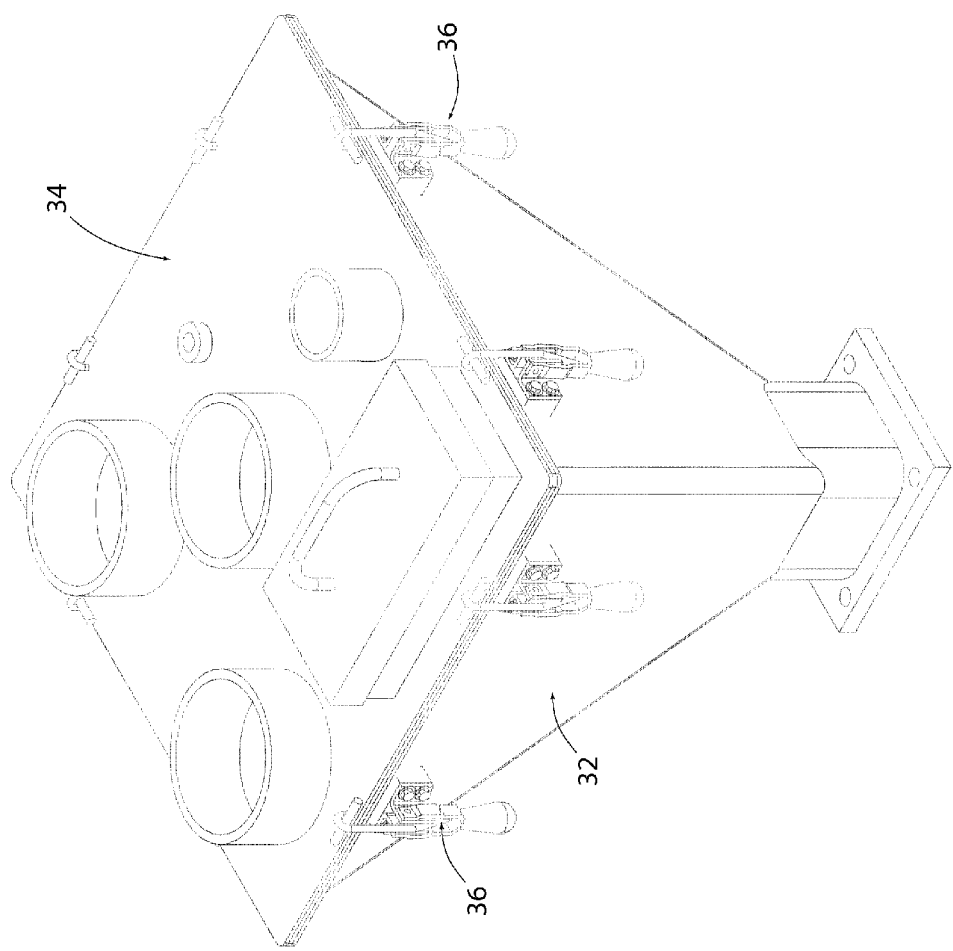
FIG. 6 is a perspective view of one of the two feed throat hoppers of the apparatus.
Figure 7:
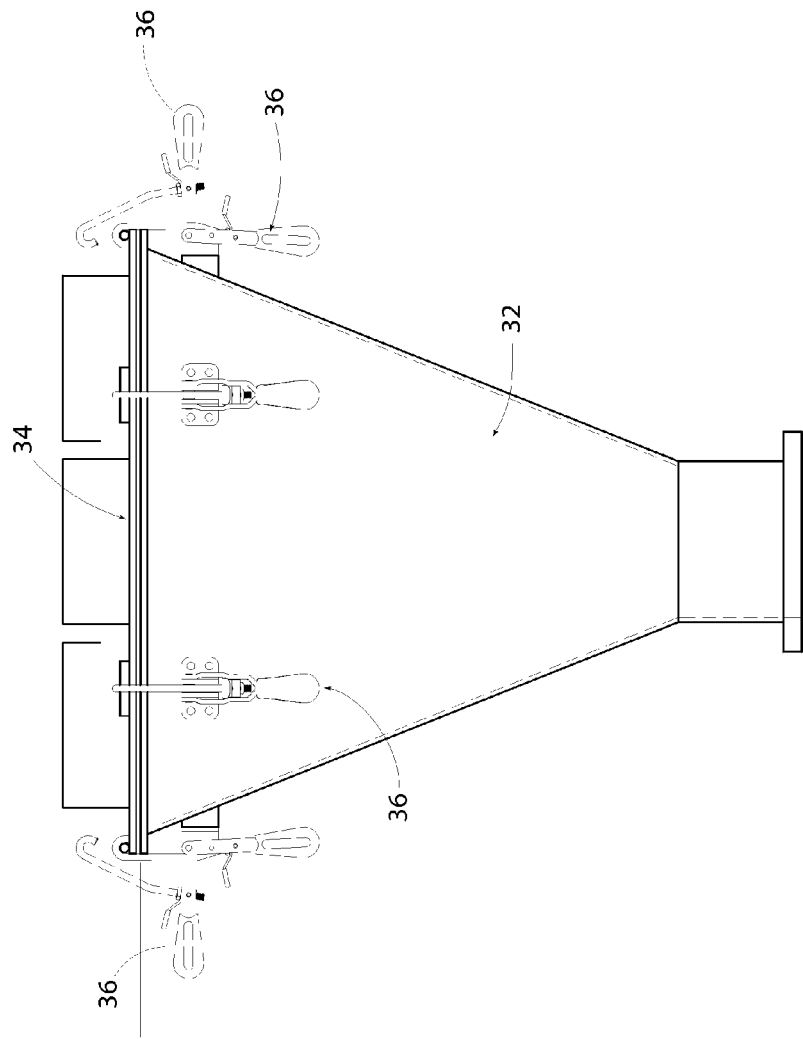
FIG. 7 is a side elevation view of the hopper of FIG. 6.
Figure 8:
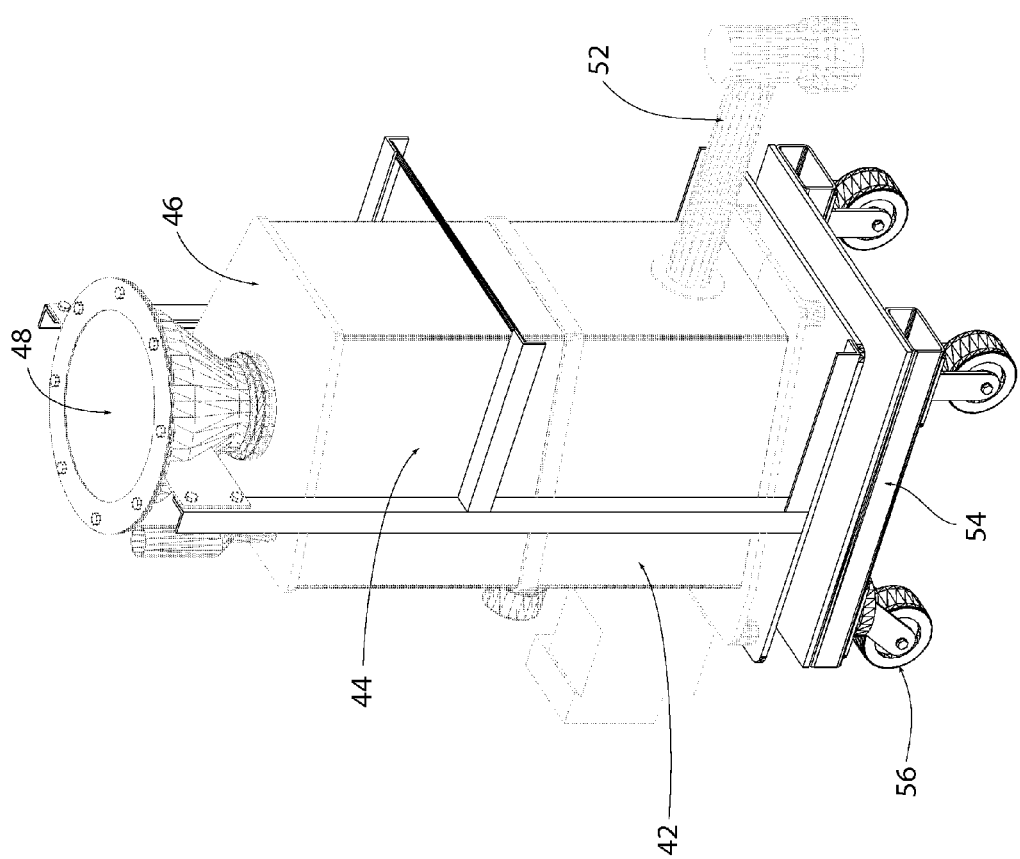
FIG. 8 is a perspective view of one of the two gravimetric feeders of the apparatus.
Figure 9:
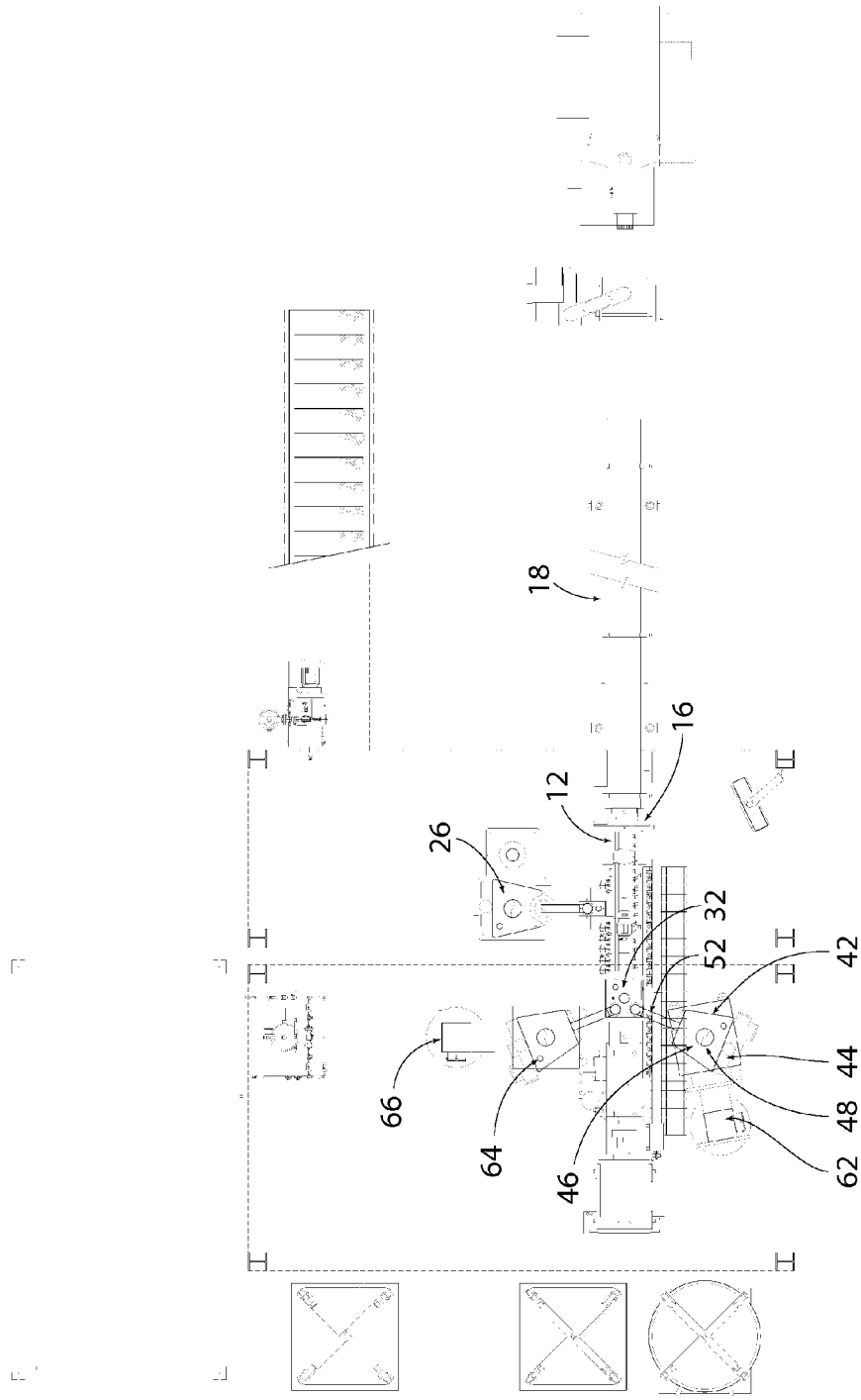
FIG. 9 is a top plan view of two gravimetric feeders that are each interchangeably and removably attached to one of the feed throat hoppers.
Figure 10:
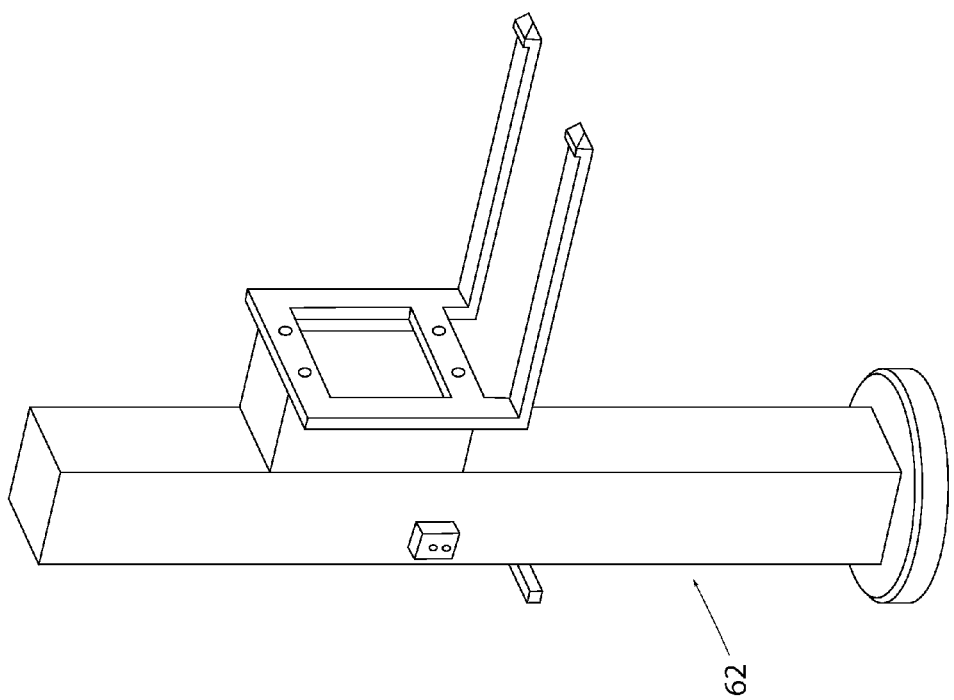
FIG. 10 is a perspective view of one of the feeder lift mechanisms of the apparatus.
Figure 11:
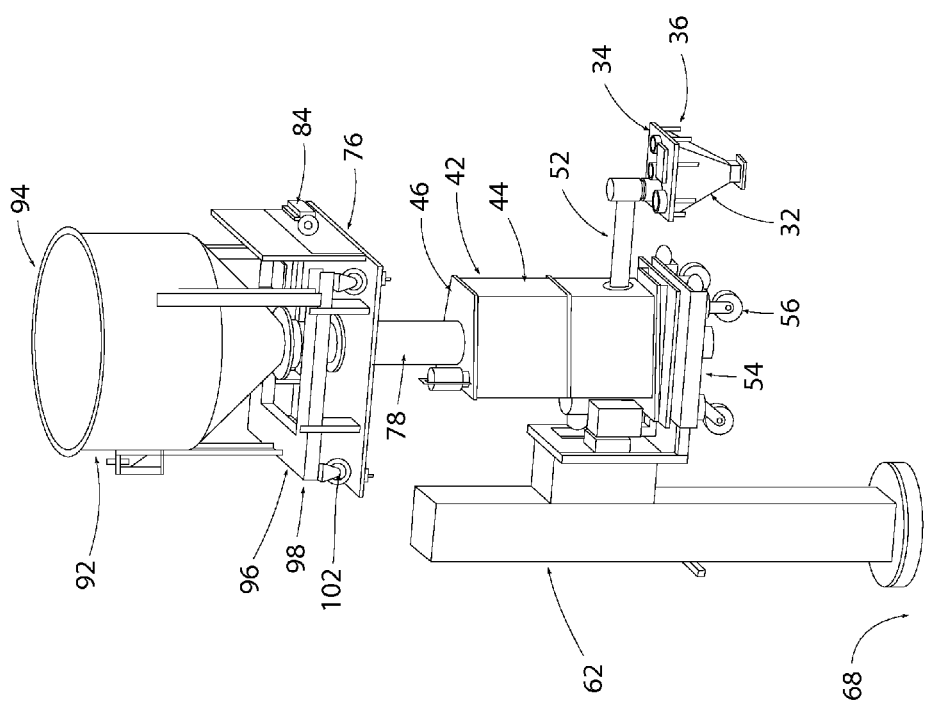
FIG. 11 is a perspective view of the hopper, gravimetric feeder, feeder lift mechanism, docking station and bowl container of the apparatus.
Figure 16:
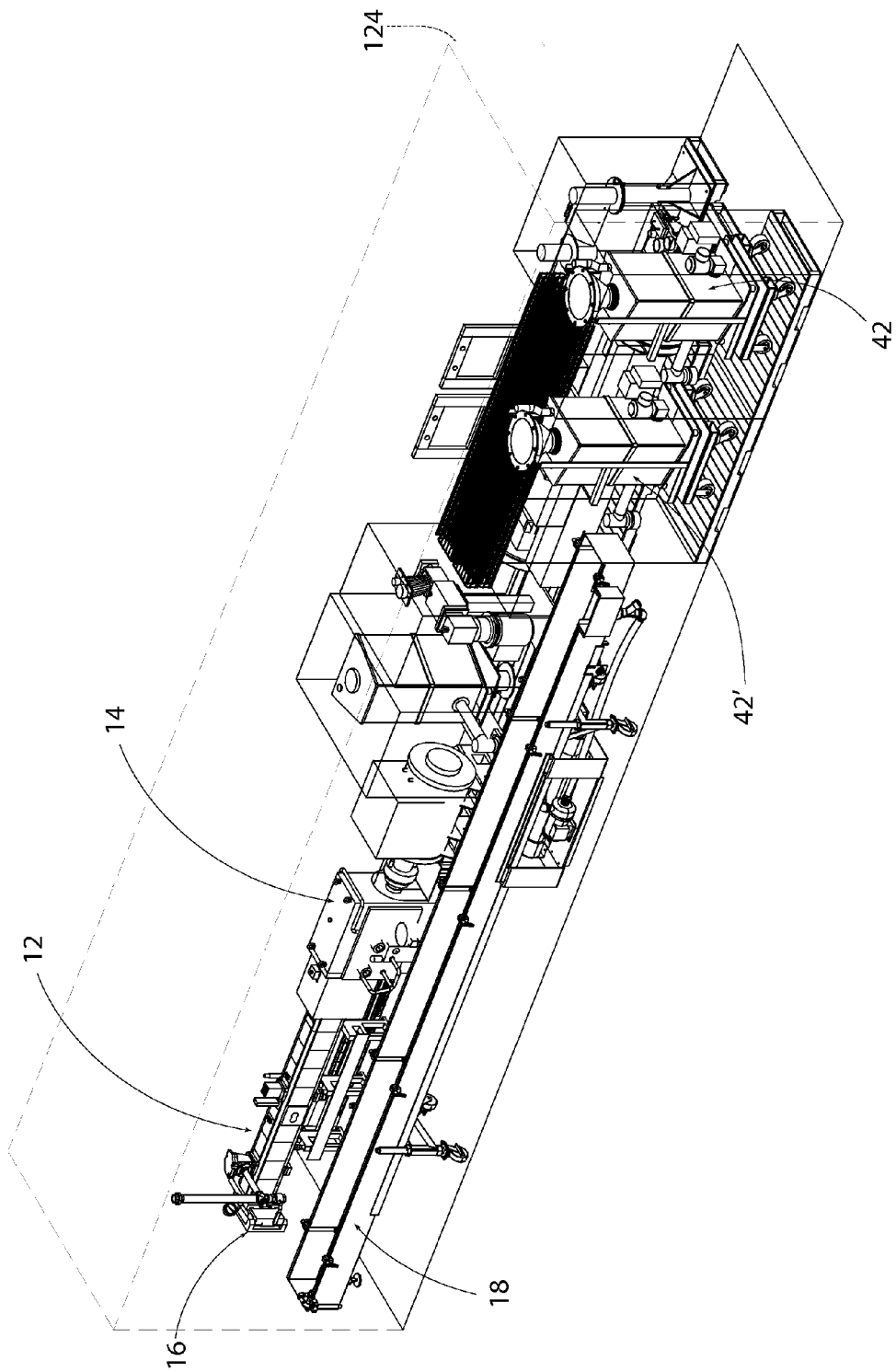

For example, the apparatus of the invention includes a feed throat hopper or hopper 32 shown in FIGS. 1, 6 and 7 that is one of at least two separate and substantially identical feed throat hoppers 32, 32' as shown in FIG. 16. Each of the hoppers 32, 32' is interchangeably and removably attachable to the proximal end of the barrel 12. Each hopper 32, 32' has an interior volume that communicates with an interior bore of the barrel 12 when each hopper is attached to the barrel. Each hopper 32, 32' has a top opening to the interior volume and a cover plate 34 that is removably attached over the top opening by a plurality of manually operable clamps 36. The clamps 36, used instead of conventional fasteners such as nut and bolt fasteners, enable the cover plate 34 to be easily and quickly removed from the hopper 32, 32'. Additional manually operable clamps 36 are used to removably attach the hopper 32, 32' to the barrel 12 and enable the hopper 32, 32' to be quickly and easily removed from the barrel 12 when it is desired to change one hopper for the other. Thus, rather than having to thoroughly clean one hopper used in an extrusion production run of a particular color plastic before beginning a further production run of a different color plastic, the first hopper 32 can be quickly and easily removed from the barrel 12 by manually disengaging the clamps 36 and quickly replaced with the second hopper 32' by attaching it to the barrel 12 with the clamps 36 to quickly begin the next production run while the first hopper 32 is cleaned offline.

Figure 12:
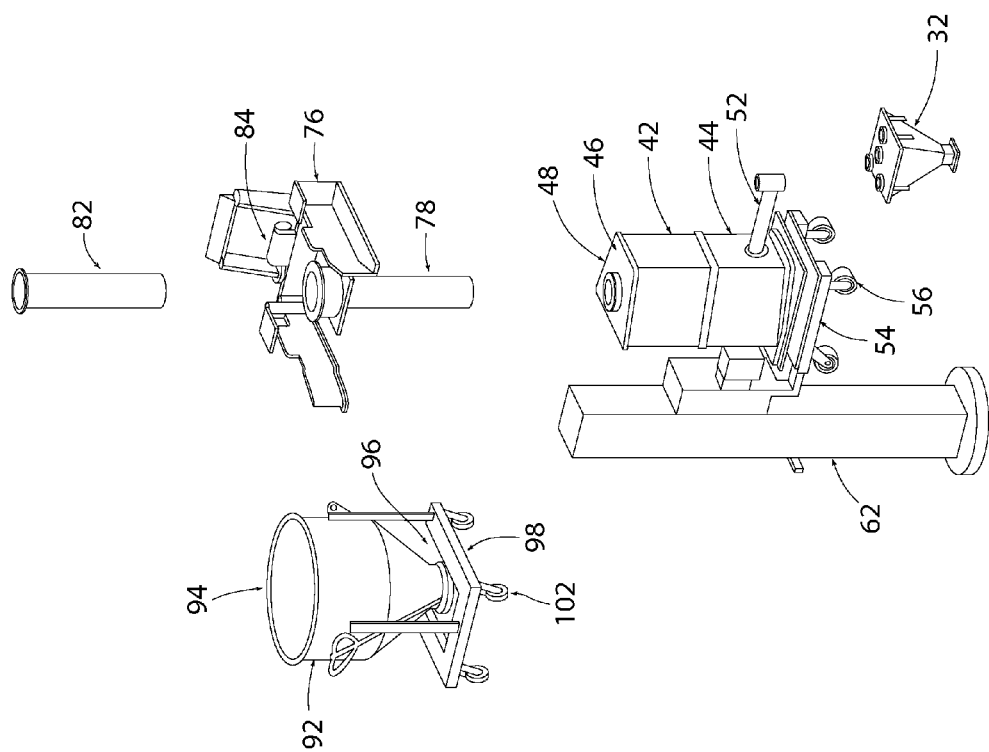
FIG. 12 is a perspective view of the component parts of the apparatus shown in FIG. 11, with the parts disengaged from each other.
Figure 13:
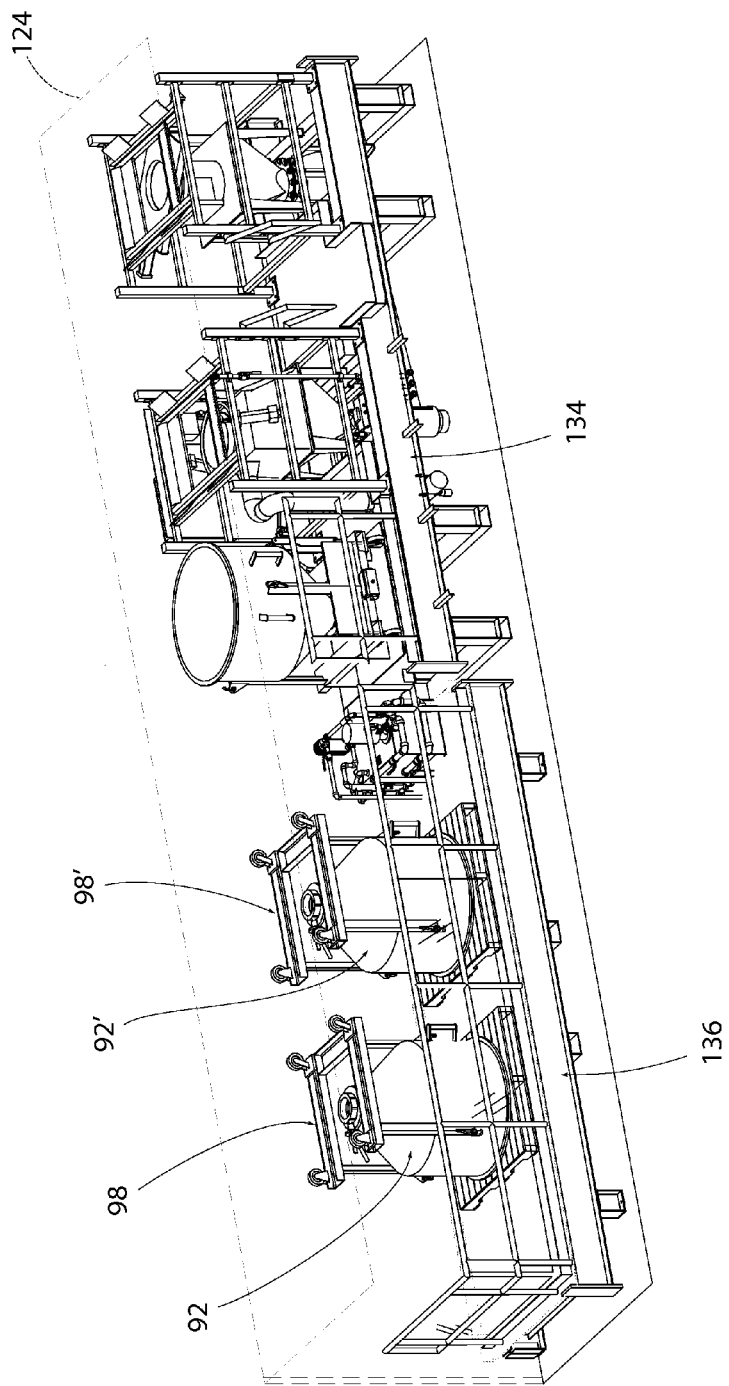
FIGS. 13 and 14 are perspective views of disassembled modules of the apparatus shown inside a schematic representation of a standard shipping container.
Figure 15:
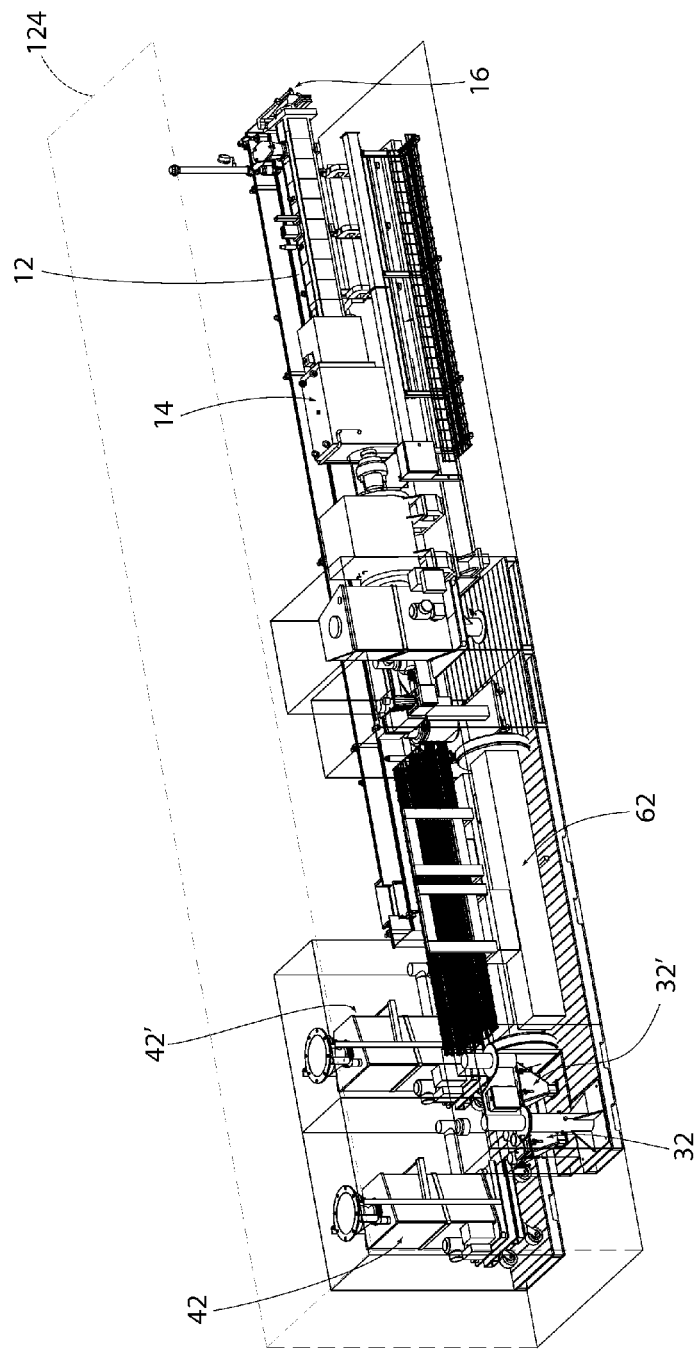
FIGS. 15 and 16 are perspective views of disassembled modules of the apparatus shown inside a schematic representation of a standard shipping container.

The apparatus of the invention is also provided with at least two separate and substantially identical gravimetric pellet blend feeders 42, 42' as shown in FIGS. 15 and 16. A first of the gravimetric feeders 42 is represented in FIG. 1 and is shown in FIGS. 3-5 and 9 removably attached to the first hopper 32. The first 42 and second 42' of the at least two gravimetric feeders are shown in FIGS. 12 and 13. In operation, the gravimetric feeders 42, 42' each feed a blend of thermoplastic pellets and other additives to the hopper 32 attached to the barrel 12. Each gravimetric feeder 42 has a housing 44 with an interior volume, a removeable lid 46, an inlet opening 48 through the lid to the housing interior volume, and an outlet tube 52 projecting from the housing 44. Each outlet rube 52 of the feeders 42, 42' is interchangeably and removably attachable to the hopper 32 connected to the barrel 12. The outlet tube 52 contains an auger that, on operation of a motive source (not shown) of the feeder, feeds a blend of thermoplastic pellets and other additives from the feeder to the hopper. Each of the gravimetric feeders 42, 42' is interchangeably and removably attachable to either of the hoppers 32, 32'. Thus, rather than having to thoroughly clean one gravimetric feeder used in a production run of one extrusion product of a particular color before beginning a further production run of a different color, the first gravimetric feeder 42 can be removed from its attachment to the hopper 32 and replaced with the second gravimetric feeder 42' to quickly commence a second production run of an extruded product of a different color while the first gravimetric feeder 42 is cleaned offline.

Each of the gravimetric feeder housings 44 is mounted on and supported by a cart 54 by a pivot connection between the housing and the cart. The pivot connection allows the housing 44 to be manually pivoted about a substantially vertical axis relative to the cart 54. Each cart 54 has a plurality of wheels 56 that enable the cart and the supported housing to be manually portable relative to the hopper 32.

The apparatus includes a feeder lift mechanism 62 positioned adjacent the hopper 32 that is connected to the proximal end of the barrel 12. The feeder lift mechanism 62 is constructed to interchangeably engage with one of the two gravimetric pellet blend feeders 42, 42' that has been manually moved on the feeder cart wheels 56 to a position adjacent the lift mechanism 62. For example, the feeder lift mechanism 62 is provided with a pair of parallel forks that are positioned to engage in channels of the gravimetric feeder cart 54 to engage the feeder lift mechanism 62 with the cart 54 in substantially the same manner as the forks of a forklift engage with a pallet. The feeder lift mechanism 62 is a pneumatic type lift mechanism and is operable to raise the engaged gravimetric feeder 42 to a raised position of the gravimetric feeder relative to the hopper 32 attached to the proximal end of the barrel 12, and to lower the raised gravimetric feeder to a lowered position of the gravimetric feeder relative to the hopper where the lowered gravimetric feeder can be manually moved off of the feeder lift mechanism forks by rolling the gravimetric feeder on its cart's wheels 56, thereby disengaging the gravimetric feeder 42 from the feeder lift mechanism 62. When the gravimetric feeder 42 is raised to its raised position by the feeder lift mechanism 62, the gravimetric feeder housing can be pivoted about its pivot axis to position the outlet tube 52 of the gravimetric feeder over the hopper 32 where the outlet tube 52 can be removably attached to the hopper to communicate the interior volume of the gravimetric feeder housing 44 with the interior volume of the hopper 32 and the interior bore of the barrel 12.

Referring to FIG. 1, it can be seen that the apparatus also includes at least a pair of gravimetric powder feeders 64 that each can be interchangeably and removably attached to the hopper 32 in the same manner as the just described gravimetric pellet blend feeders 42, 42'. As represented in FIG. 1, an additional lift mechanism 66 is provided for the at least two gravimetric powder feeders 64. The lift mechanism 66 of the powder feeders operates in substantially the same manner as the just described lift mechanism 62 of the pellet blend feeders 42, 42'.

The described barrel 12, the hopper 32 removably attached to the barrel, the lift mechanisms 62, 66 and the feeders 42, 64 supported on their respective lift mechanisms are all supported on a lower support surface 68 of the apparatus. The lower support surface could be a concrete pad poured specifically for the apparatus. Alternatively, the support surface could be a floor surface in the building of a manufacturing facility, or some other similar type of support surface.

Referring to FIGS. 2-5, it is shown that the apparatus includes a second or upper support surface 72. The upper support surface 72 is supported above the lower support surface 68 and the barrel 12, hopper 32, lift mechanisms 62, 64 and their respective feeders 42, 66 by a structural framework 74. The structural framework 74 is constructed from different lengths and sizes of conventional structural members such as I-beams.

The apparatus includes a docking station 76 supported on the upper support surface 72. The docking station is positioned above the gravimetric feeder 42 when the gravimetric feeder 42 is connected with and raised by a feeder lift mechanism 62 and the output tube 52 of the feeder is connected with the hopper 32. The docking station 76 has a discharge tube 78 that extends downwardly from the docking station. The discharge tube 78 is removably attachable to the inlet opening 48 of the gravimetric feeder 42 that is held in its raised position by the feeder lift mechanism 62 beneath the docking station 76. The docking station 76 includes at least two separate and substantially identical tubular sleeves 82. Each of the sleeves 82 is interchangeably and removably manually insertable into the discharge tube 78 to line the interior of the discharge tube. Thus, rather than having to thoroughly clean the inside of the docking station discharge tube 78 used in an extrusion production run of a particular color of plastic before beginning a further production run of a different color plastic, the sleeve 82 used in a first production run can be manually removed from the discharge tube 78 and quickly replaced with a second sleeve to quickly begin the next production run while the first sleeve is cleaned off line. The docking station 76 also includes a valve actuator 84. The valve actuator 84 is positioned on the docking station 76 to operatively engage with a valve and selectively open and close the valve.

The apparatus is also provided with at least two separate and substantially identical pallet mixer bowl containers 92, 92' as shown in FIGS. 1, 4, 5, and 11-14. Each of the mixer bowl containers 92 has a top opening 94 and an opposite bottom opening with a valve 96 at the bottom opening that is selectively controlled to be opened and closed. Each of the mixer bowl containers 92 has the general configuration of a funnel having an interior that is communicated through the bottom opening when the valve 96 is moved to its open position. Each of the bowl containers 92 is supported on a cart 98. The cart 98 has a plurality of wheels 102 what enable the cart and the supported bowl container to be manually portable relative to the apparatus. Each bowl container 92 and its associated cart 98 are dimensioned to be interchangeably and removably received in the docking station 76. The bowl containers 92 are manually moveable on their cart wheels 102 into the docking station 76 to a position where the valve 96 at the bowl container bottom opening is operatively connected with the docking station valve actuator 84 and the bowl container bottom opening communicates with the docking station discharge tube 78. With one of the bowl containers 92 positioned in the docking station 76, the valve actuator 84 of the docking station can be selectively operated to open the bowl container valve 96. The funnel configuration of the bowl container 92 channels the mix of thermoplastic pellets contained in the bowl container 92 downwardly through the bowl container bottom opening and into the discharge tube 78 of the docking station 76. The discharge tube 78 then delivers the mix of pellets to the gravimetric feeder 42 currently positioned below the docking station. When the bowl container 92 is empty or when the production run of one extrusion product of a particular color is completed, the first bowl container 92 can be quickly removed from the docking station 76 by rolling the container on its cart wheels 102 to a location away from the docking station 76, and a second bowl container 92' can be manually rolled into the docking station 76 and connected with the docking station discharge tube 78 and valve actuator 84 to continue with the first production run or to begin a second production run of a different colored product. The first bowl container 92 can then be cleaned off line. Providing the valve 96 as part of the bowl container 92 also enables the valve 96 to be cleaned off line.

Figure 2:
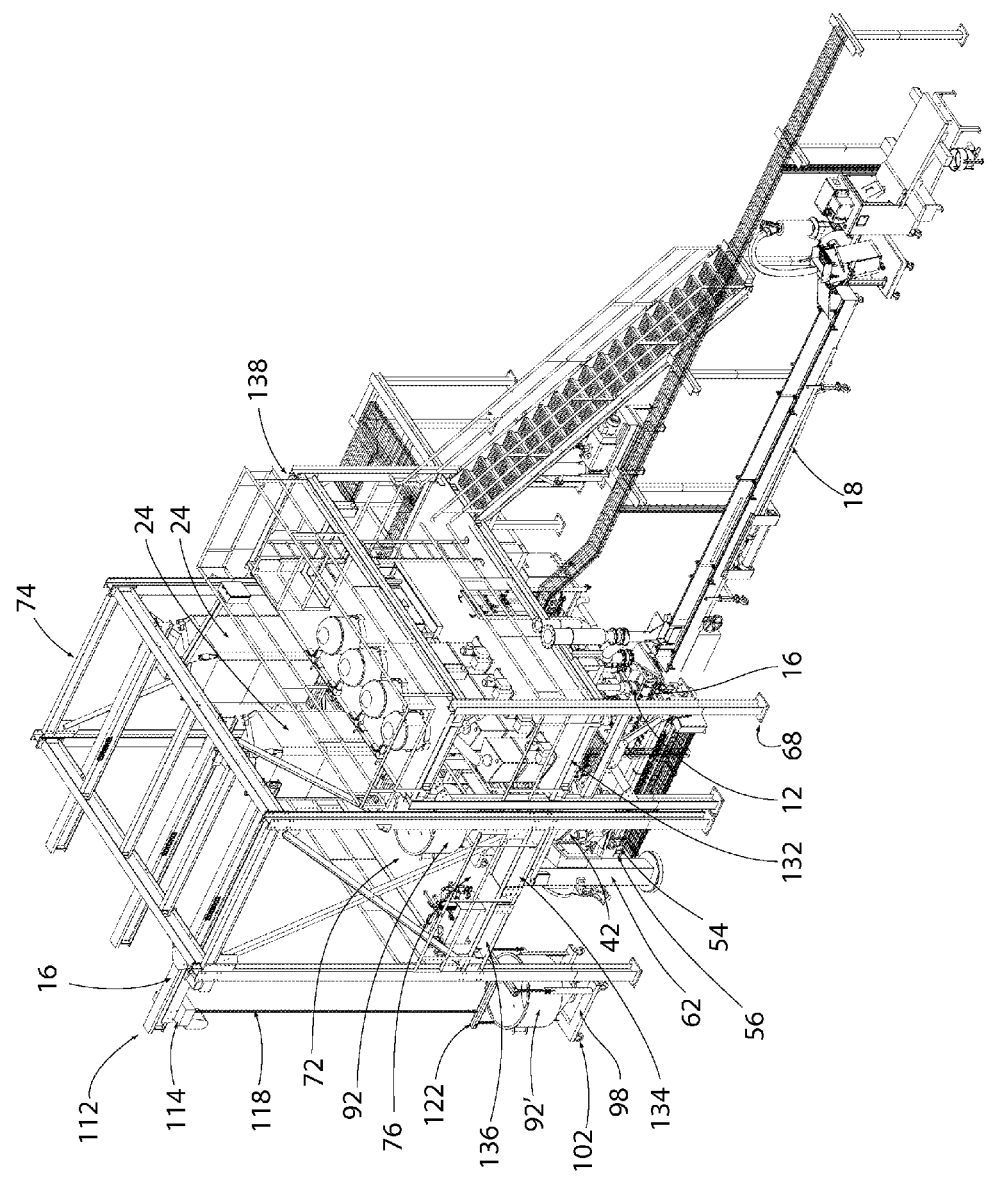
FIG. 2 is a perspective view of the assembled apparatus.
Figure 3:
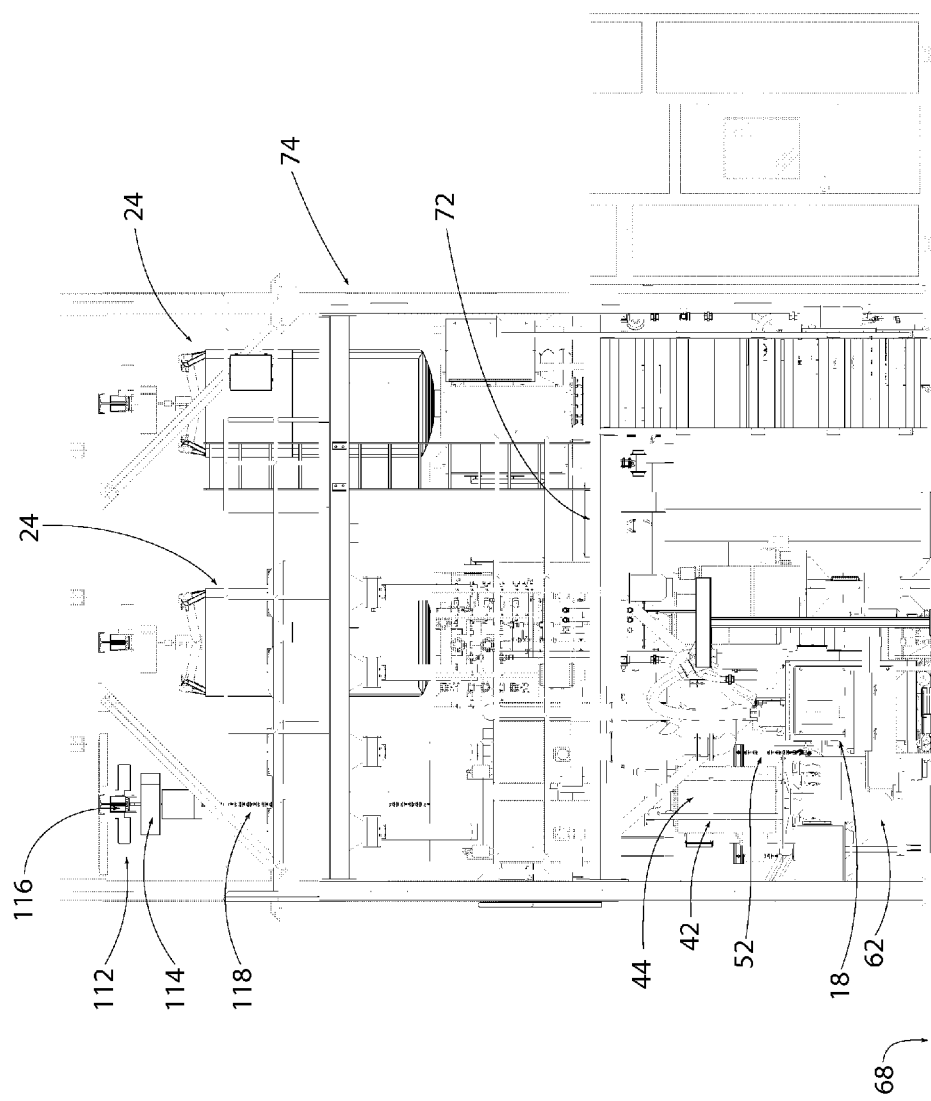
FIG. 3 is an elevation view of the front or right side of the apparatus as shown in FIG. 2.
Figure 4:
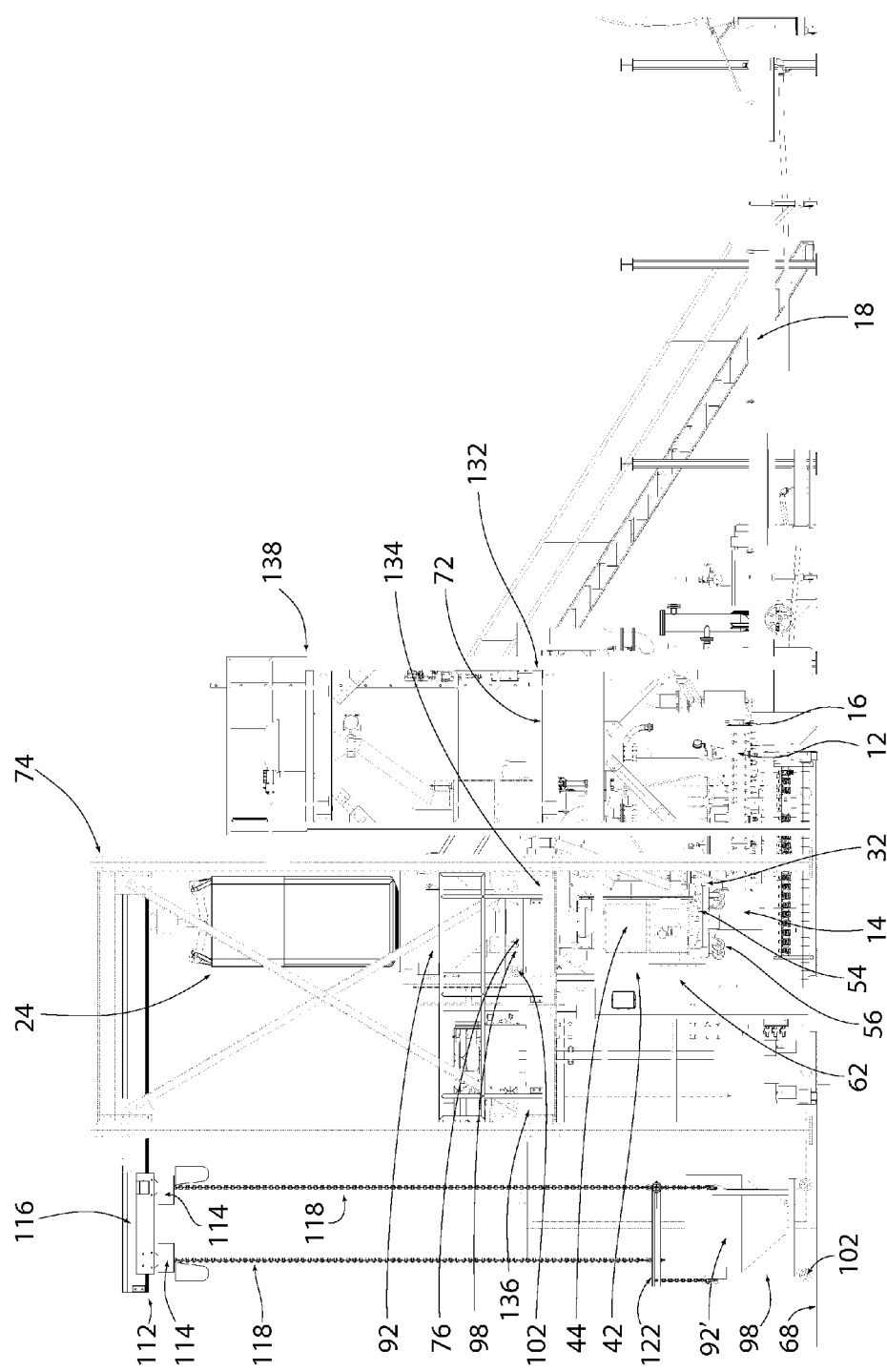
FIG. 4 is an elevation view of the left side of the apparatus as shown in FIGS. 2 and 3.
Figure 5:
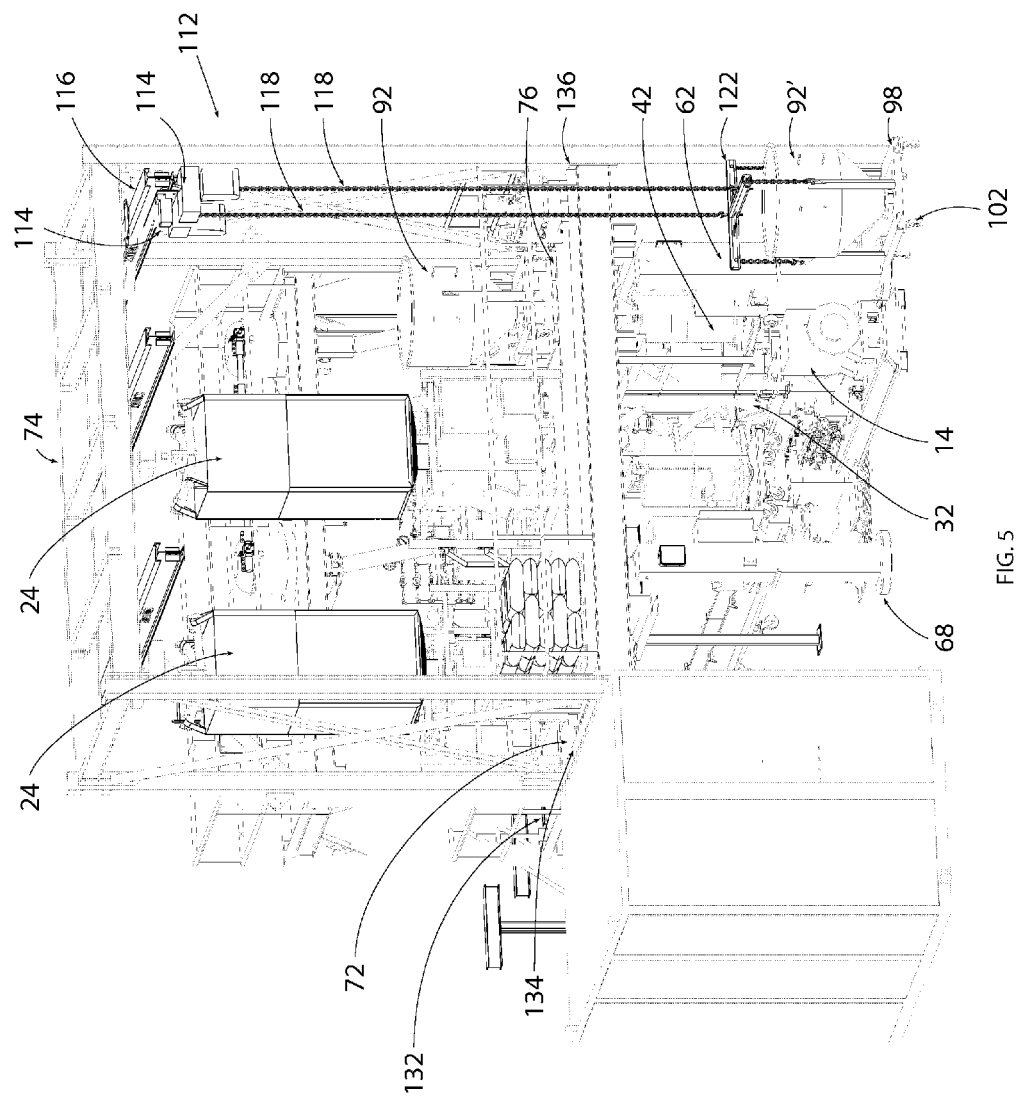
FIG. 5 is a perspective view of the rear of the apparatus and the right side of the apparatus as shown in FIG. 3.

The apparatus also includes a container lift mechanism 112 that is operable to selectively raise and lower each of the mixer bowl containers 92, 92' relative to the apparatus, and to selectively move the mixer bowl containers horizontally relative to the apparatus. The container lift mechanism 112 includes a selectively operable electric hoist 114 that is mounted on a horizontal rail 116 of the apparatus structural frame work 74. The hoist 114 is moveable along the rail 116 from a position of the hoist 114 outside of the structural frame work 74 as shown in FIG. 2, to a position of the hoist directly above the docking station 76. A length of chain 118 extends downwardly from the hoist 114 to a T-shaped hooking assembly 122 that is removably attachable to each of the mixer bowl containers 92, 92' to interchangeably and removably attach each of the containers to the container lifting mechanism 112. The container lifting mechanism 112 is operable to vertically raise the bowl container 92 removably attached to the hooking assembly 112 to a raised position of the bowl container relative to the docking station 76, and to horizontally move the bowl container 92 into the docking station 76 to a position where the bowl container bottom opening is communicated with the docking station discharge tube 78 and the bowl container valve 96 is operatively connected to the valve actuator 84 of the docking station 76. When the bowl container 92 is empty, the container lifting mechanism 112 is operable to move the emptied bowl container 92 horizontally to the end of the rail 116 and then to vertically lower the emptied container 92 to the lower support surface 68 of the apparatus. The second mixer bowl container 92' can then be attached to the hooking assembly 122 and raised by the lift mechanism 112 to a position adjacent the docking station 76, and then moved horizontally by the lift mechanism into the docking station 76. Thus, rather than having to thoroughly clean one mixer bowl container 92 and its valve 96 used in a production run of one extrusion product of a particular color before beginning a further production run of a different color, the first bowl container 92 can be removed from the docking station 76 by the container lift mechanism 112 and replaced with the second bowl container 92' to quickly begin a second production run of a extruded product of a different color while the first bowl container 92 and its valve 96 are cleaned off line.

Referring to FIGS. 13-20, it is shown that several of the component parts of the apparatus are assembled as discrete modules that can be disassembled from the apparatus and packaged in standard sized shipping containers 124 represented by the dashed lines in FIGS. 13-20. The modules of the apparatus can then be shipped to a particular location where they can be unloaded from the shipping containers 124 and quickly assembled to produce the plastic extrusion apparatus of the invention. Some of the modules shown in FIGS. 13-20 include the barrel 12 with the preassembled motive source 14 and die head 16, the assembled water bath 18, the bulk bag unloaders 24, the fiberglass side feeder 26, the at least two hoppers 32, 32', the at least two gravimetric feeders 32, 32', the feeder lift mechanism 62, preassembled portions of the structural framework 74, the docking station 76 and the pellet mixer roll containers 92, 92'. Each of these separate modules of the apparatus can be disassembled from the apparatus as separate modules and packed in the standard shipping containers 24 for shipment to an end user's location, and then quickly removed from the shipping containers and reassembled into the apparatus.

Figure 14:
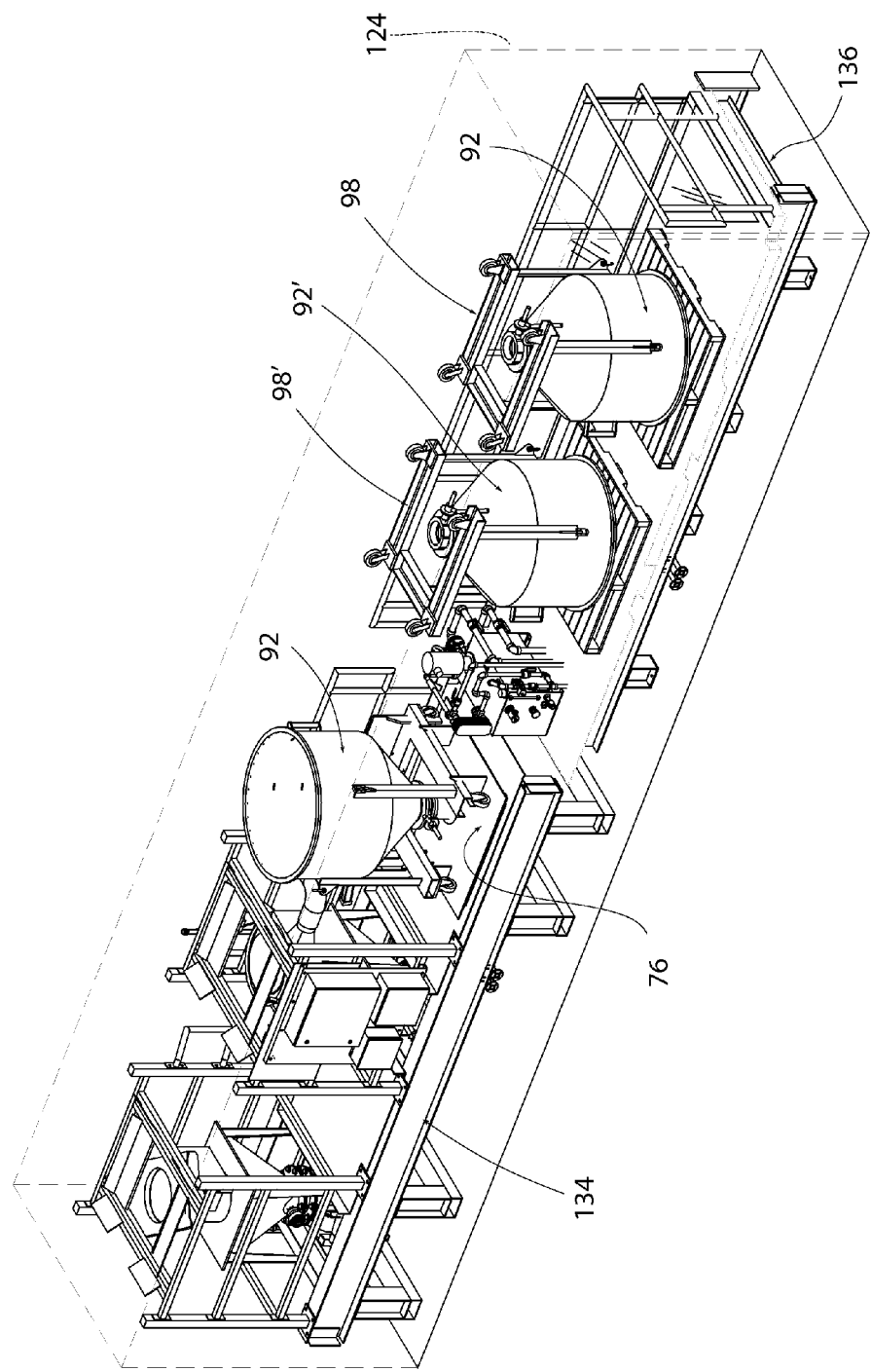
Figure 17:
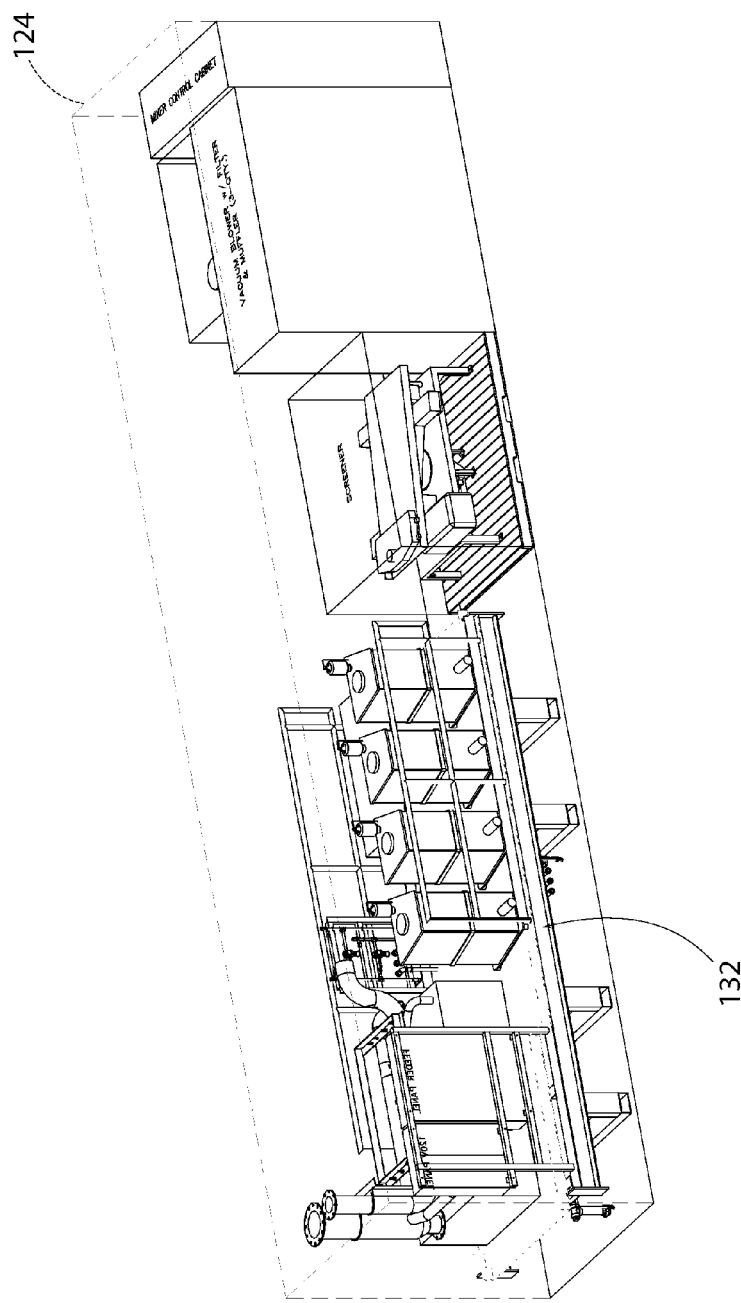
FIGS. 17 and 18 are perspective views of disassembled modules of the apparatus shown inside a schematic representation of a standard shipping container.
Figure 18:
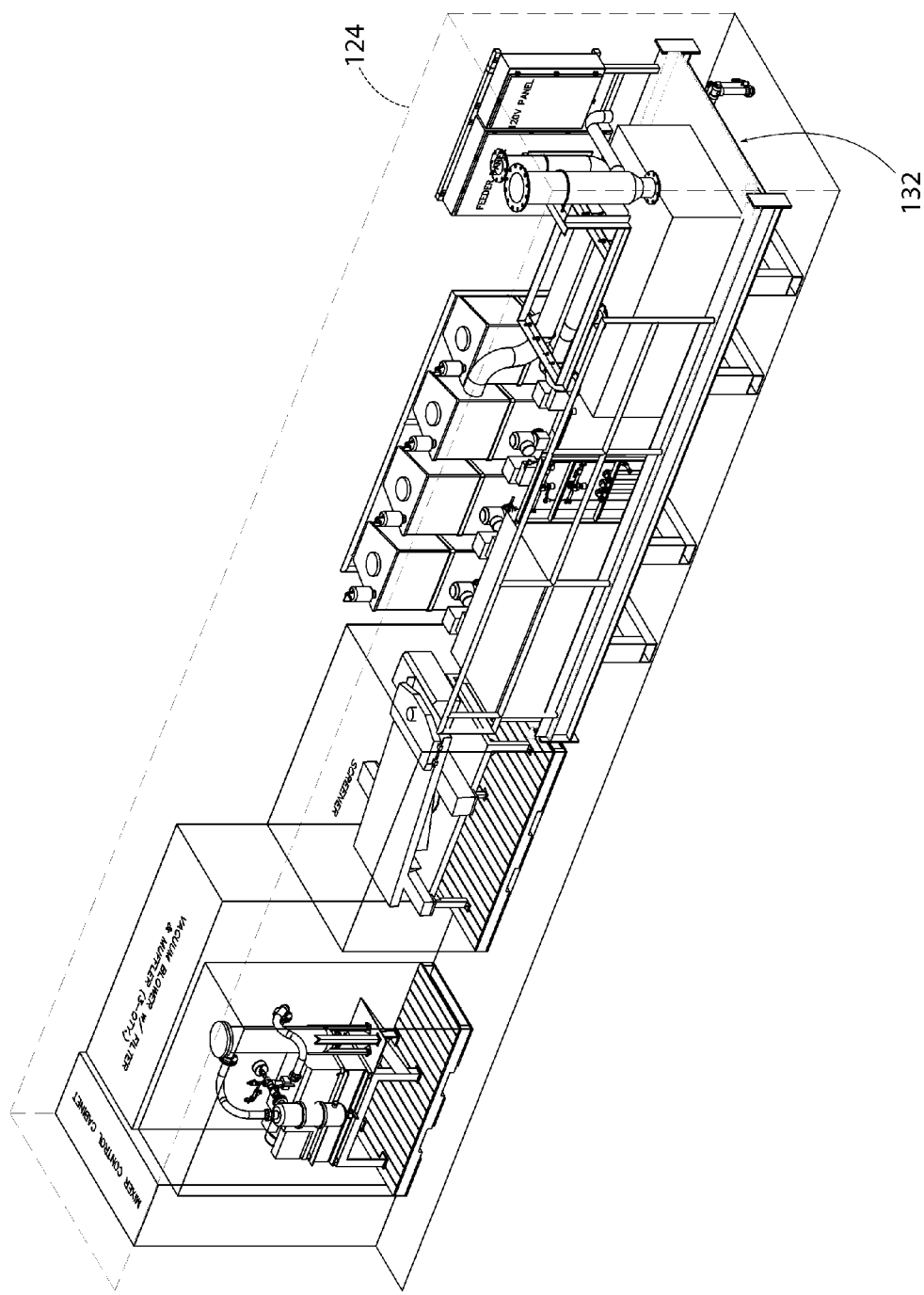
Figure 19:
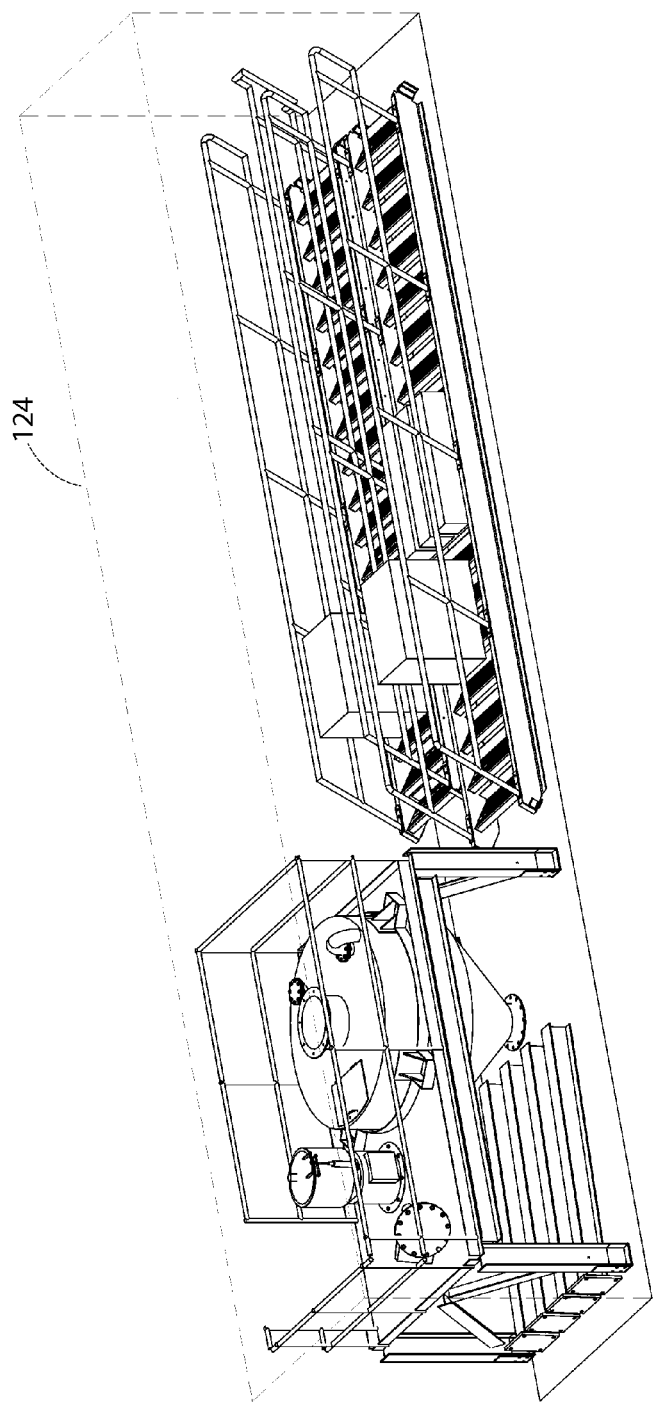
FIG. 19 is a perspective view of disassembled modules of the apparatus shown inside a schematic representation of a standard shipping container.
Figure 21:
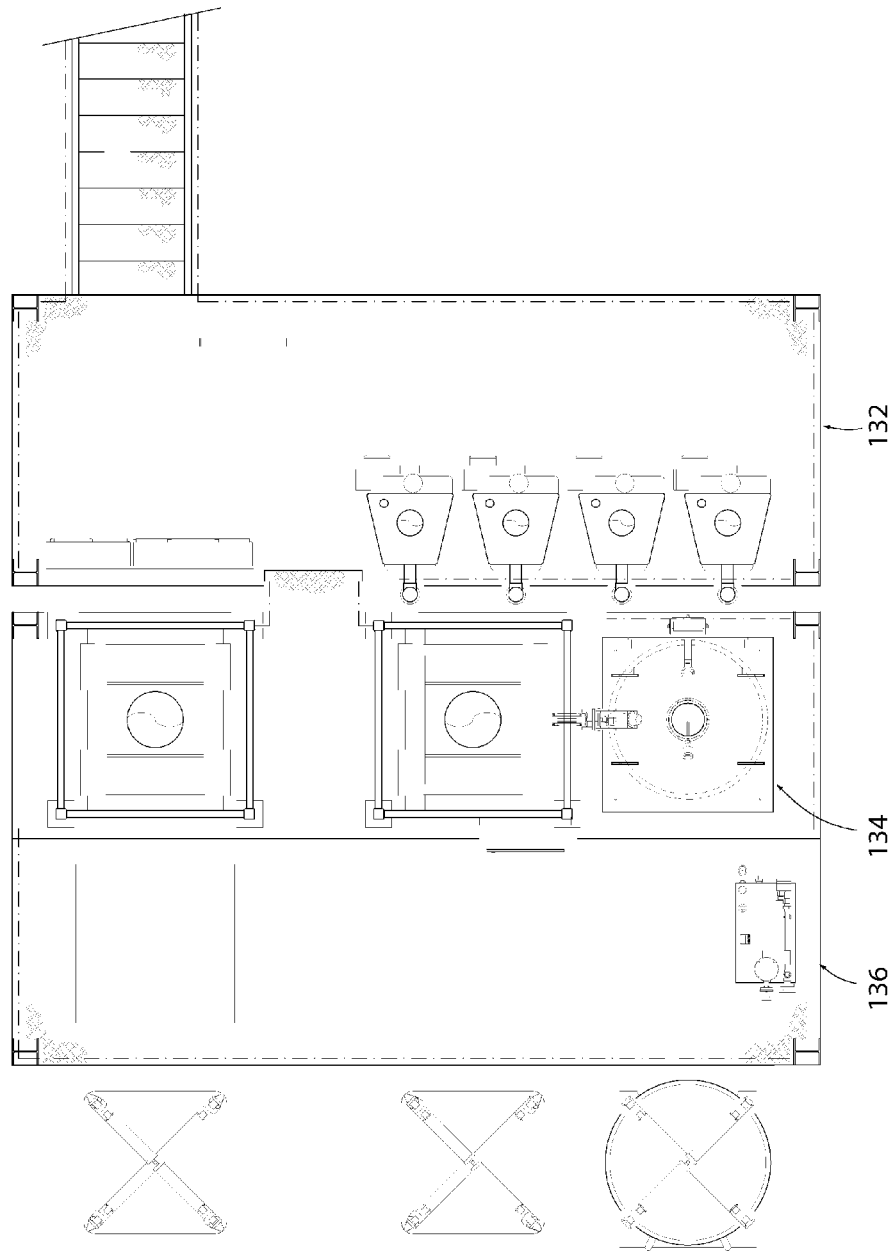
FIG. 21 is a plan view of a first upper level of the apparatus.
Figure 22:
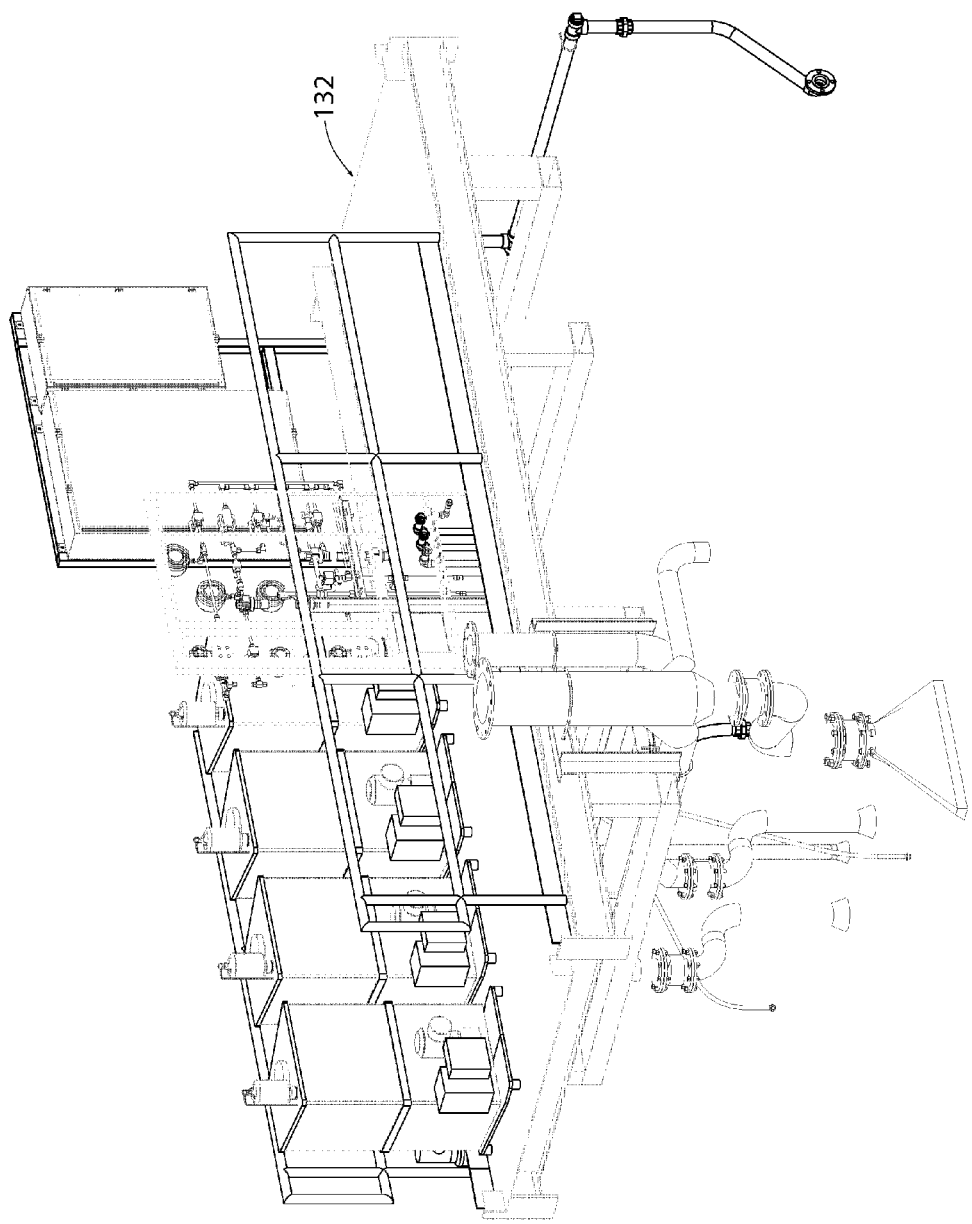
FIG. 22 is a perspective view of a module of the apparatus removed from the upper level of the apparatus shown in FIG. 21.
Figure 23:
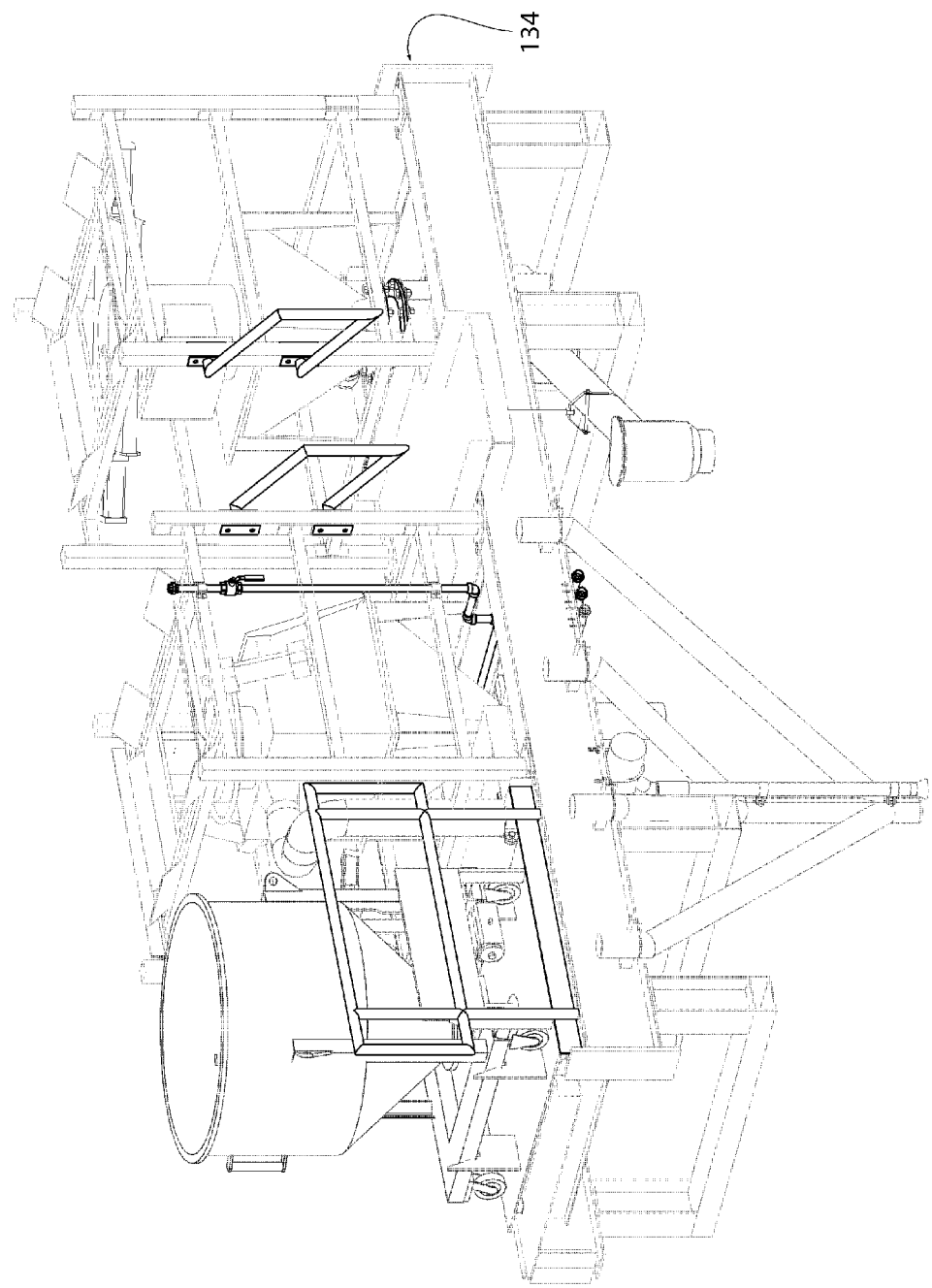
FIG. 23 is a perspective view of a module of the apparatus removed from the upper level of the apparatus shown in FIG. 21.
Figure 24:
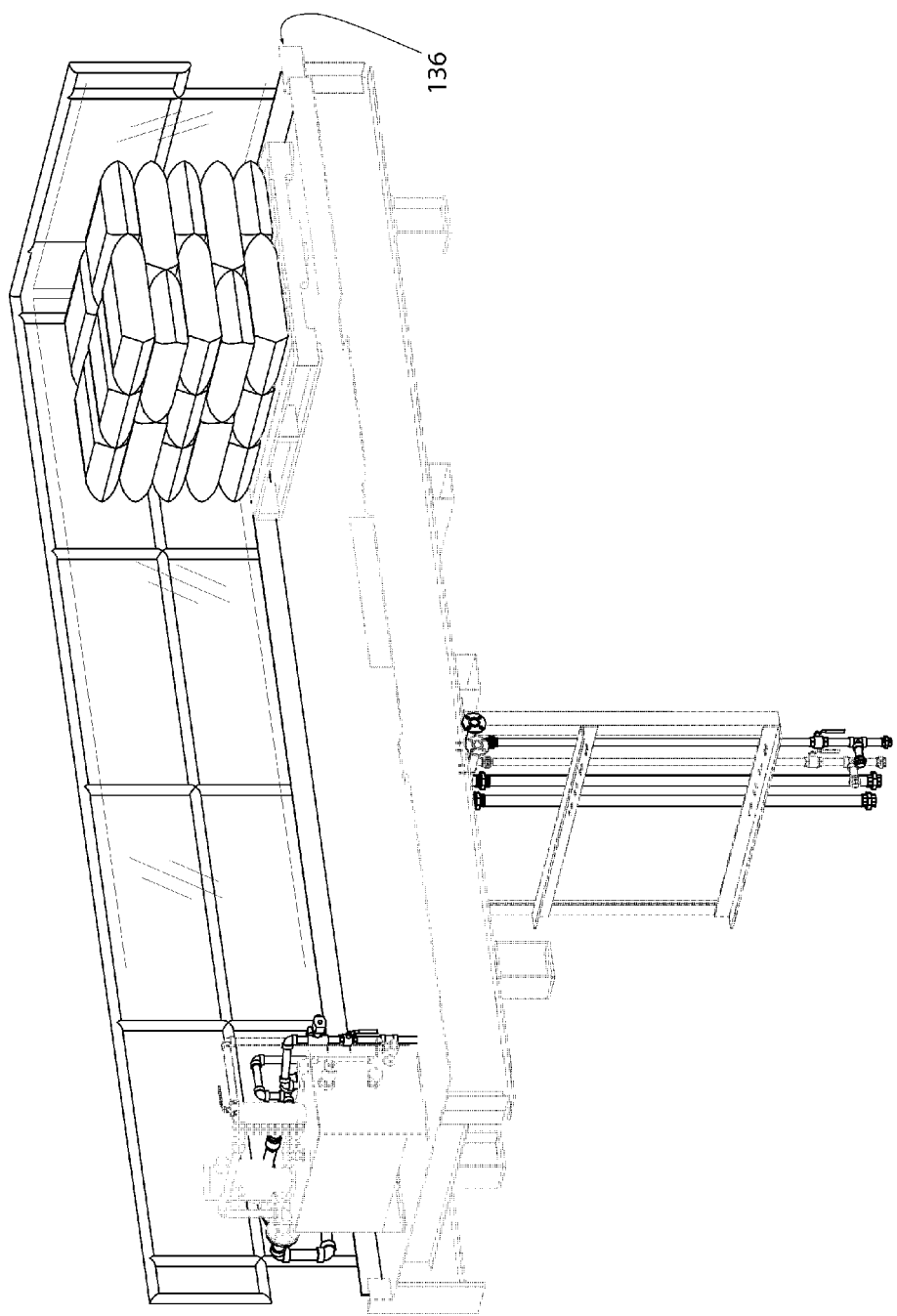
FIG. 24 is a perspective view of a module of the apparatus removed from the upper level of the apparatus shown in FIG. 21.

Referring to FIG. 21, the apparatus includes a first upper level platform that is basically comprised of three platform sections or modules 132, 134, 136. The three modules 132, 134, 136 can also be seen in FIGS. 2 and 4. Each of these modules 132, 134, 136 has component parts of the apparatus secured to its platform section. Each platform section with its associated component parts can be separated from a previously assembled apparatus and stored in a shipping container for shipment to another site where the apparatus can be quickly reassembled. For example, the first of the three modules 132 in FIG. 21 can be separated from the other two modules and the previously assembled apparatus and stored in a shipping container as shown in FIGS. 17 and 18. A second 134 of the three modules can be separated from the previously assembled apparatus and stored in a shipping container as shown in FIGS. 13 and 14. A third of the modules 136 can be disassembled from a previously assembled apparatus and stored in a shipping container as shown in FIGS. 13 and 14. A perspective view of the first module 132 of the three modules removed from the apparatus is shown in FIG. 22. A perspective view of the second module 134 removed from the apparatus is shown in FIG. 23. A perspective view of the third module 136 removed from the apparatus is shown in FIG. 24.

Figure 20:
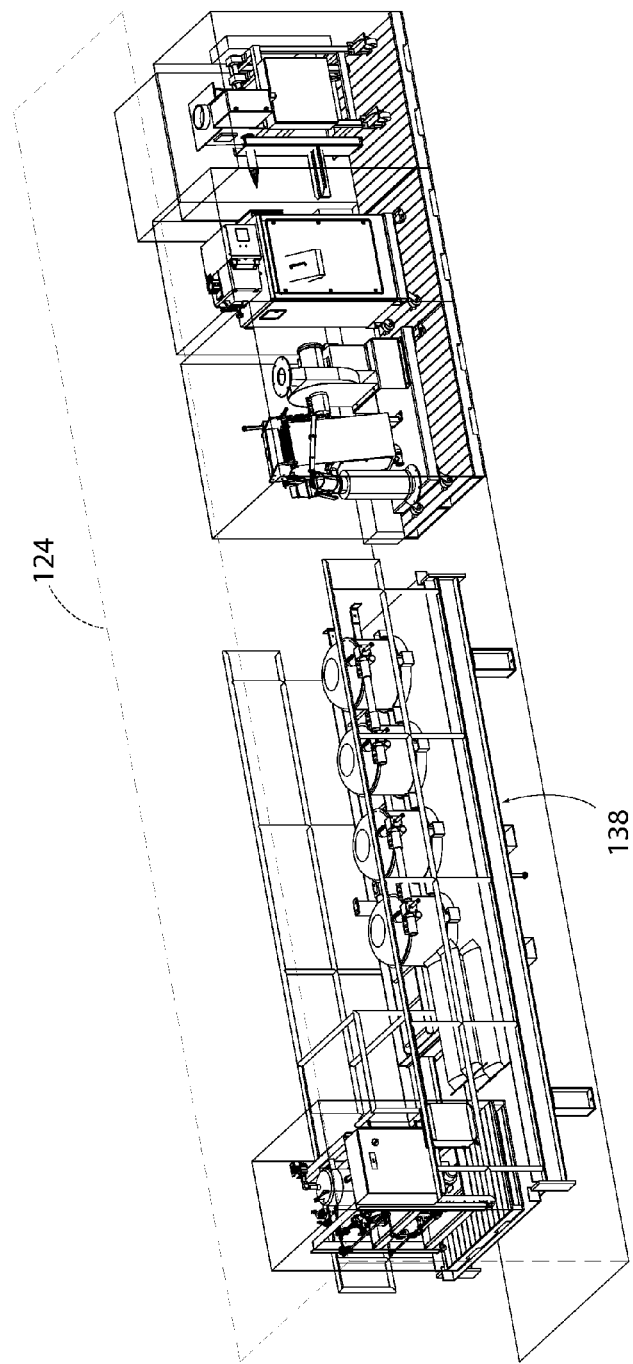
FIG. 20 is a perspective view of a disassembled module of the apparatus shown inside a schematic representation of a standard shipping container.
Figure 25:
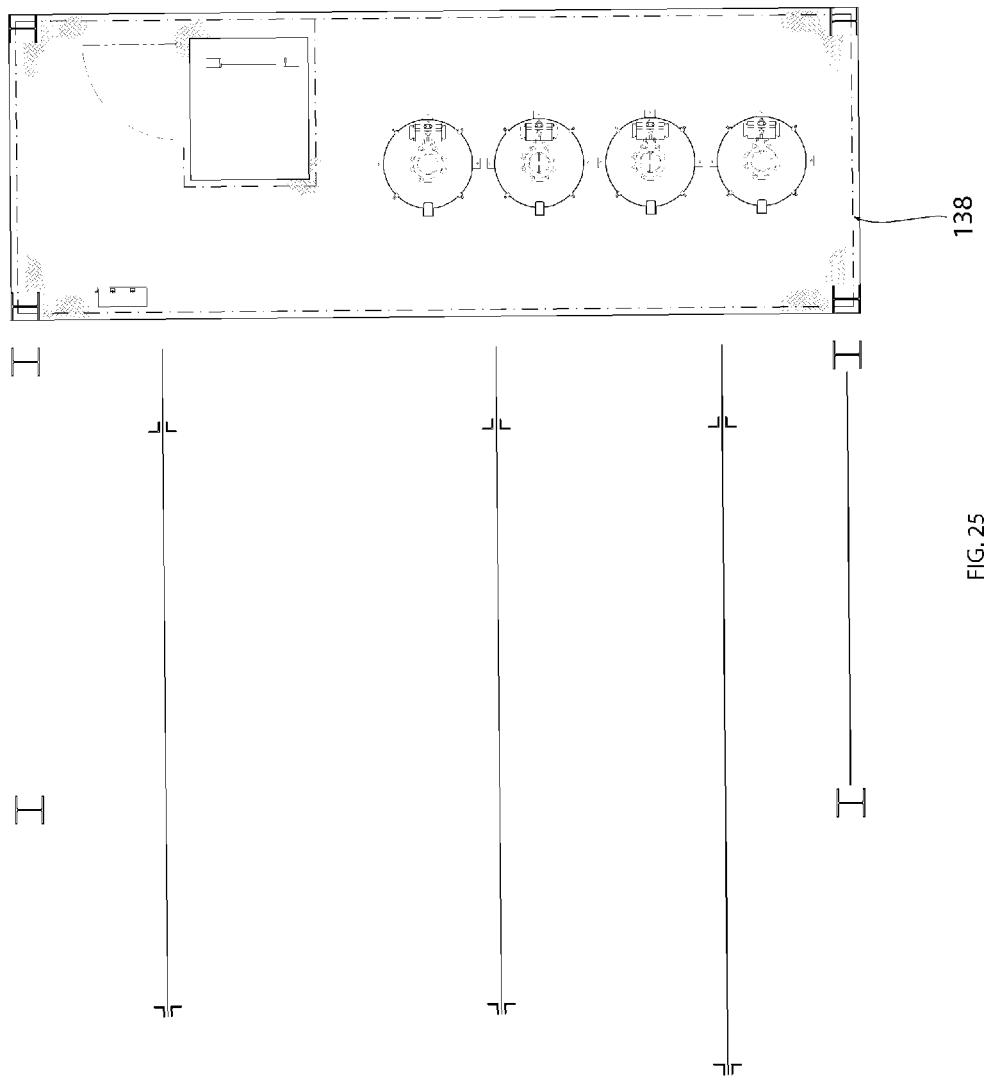
FIG. 25 is a plan view of a second upper level of the apparatus.

FIG. 25 is a plan view of a second upper level of the apparatus. This second upper level also defines a separate module 138 of the apparatus. The second upper level module 138 can also be seen in FIGS. 2 and 4. This second upper level module 138 can also be removed from a previously assembled apparatus and stored in a shipping container as shown in FIG. 20. A perspective view of the second upper level module 138 removed from the apparatus is shown in FIG. 26.

As explained above, the assembled apparatus comprising its multiple modules can be disassembled separating the modules from the previously assembled apparatus. The disassembled modules can then be stored in standard size shipping containers for shipment of the apparatus to another location. When the shipping containers arrive at the other location, the modules of the apparatus can be removed from the shipping containers and reassembled into the completely assembled apparatus. Because the modules are each comprised of several component parts of the apparatus pre-assembled into the module, the assembly of the modules together to produce the assembled apparatus can be done time efficiently and cost efficiently. The construction of the apparatus of separate modules also enables the apparatus to be pre-assembled and tested prior to shipping. When shipped to its end location the modules enable the apparatus to be quickly reassembled and started up in less than three weeks after receipt at the location.

As various modifications could be made to the apparatus herein described and illustrated without parting from the scope of the invention, it is intended that all of the matter contained in the foregoing description or shown in the accompanying drawing shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. A plastic extrusion apparatus comprising:
    a barrel containing a drive screw, the barrel having a length with opposite proximal and distal ends;
    a motive source operatively connected to the barrel proximal end for rotating the drive screw in the barrel in response to operation of the motive source;
    a die head at the barrel distal end;
    at least one hopper removably attached to the barrel adjacent the barrel proximal end, the hopper having an interior volume, a top opening to the interior volume and a cover plate that is removably attached over the top opening;
    at least one gravimetric feeder removably attached to the hopper, the gravimetric feeder having a housing and an outlet tube projecting from the housing, the outlet tube being removably attached to the hopper;
    a feeder lift mechanism adjacent the hopper, the feeder lift mechanism being constructed to raise the gravimetric feeder to a raised position of the gravimetric feeder relative to the hopper, and lower the raised gravimetric feeder to a lowered position of the gravimetric feeder relative to the hopper;
    a docking station above the hopper and the feeder lift mechanism, the docking station having a discharge tube that extends downwardly from the docking station and communicates with the gravimetric feeder when the gravimetric feeder is raised to the raised position by the feeder lift mechanism;
    at least one bowl container in the docking station, the bowl container having a top opening and an opposite bottom opening with a valve at the bottom opening that is selectively controlled to be opened and closed; and
    a container lift mechanism adjacent the hopper, the feeder lift mechanism and the docking station, the container lift mechanism being constructed to vertically raise the bowl container to a raised position of the bowl container relative to the docking station and horizontally move the bowl container into the docking station to a position where the bowl container bottom opening is communicated with the docking station discharge tube.

2. The apparatus of claim 1, further comprising:
    the at least one hopper is one of at least two separate and substantially identical hoppers, each hopper being interchangeably and removably attachable to the barrel adjacent the barrel proximal end by a plurality of manually operable clamps, each hopper having an interior volume, each hopper having a top opening to the interior volume and a cover plate that is removably attached over the top opening by a plurality of manually operable clamps.

3. The apparatus of claim 1, further comprising:
    the at least one gravimetric feeder being one of at least two separate and substantially identical gravimetric feeders, each gravimetric feeder being interchangeably and removably attachable to the hopper, each gravimetric feeder having a housing and an outlet tube projecting from the housing, the outlet tube being removably attachable to the hopper, each housing being mounted on and supported by a cart by a pivot connection between the housing and the cart that allows the housing to be manually pivoted about an axis relative to the cart, and each cart having a plurality of wheels that enable the cart and the supported housing to be manually portable on the cart wheels relative to the hopper.

4. The apparatus of claim 3, further comprising:
    the feeder lift mechanism being constructed to interchangeably engage with one of the two gravimetric feeders that has been manually moved to a position adjacent the feeder lift mechanism, raise the engaged gravimetric feeder to a raised position of the gravimetric feeder relative to the hopper, and lower the raised gravimetric feeder to a lowered position of the feeder relative to the hopper.

5. The apparatus of claim 1, further comprising:
at least two separate and substantially identical tubular sleeves, each sleeve being interchangeably and removably manually insertable inside the discharge tube of the docking station.

6. The apparatus of claim 1, further comprising:
the at least one bowl container being one of at least two separate and substantially identical bowl containers, each bowl container being interchangeably and removably receivable in the docking station, each bowl container having a top opening and an opposite bottom opening with a valve at the bottom opening that is selectively controlled to be opened and closed, each bowl container being mounted on and supported by a cart having a plurality of wheels that enable the cart and the supported bowl container to be manually portable relative to the hopper.

7. The apparatus of claim 1, further comprising:
the docking station having a valve actuator on the docking station and the valve actuator is operatively connected with the bowl container valve and is manually operable to selectively open and close the bowl container valve when the bowl container is in the docking station.

8. The apparatus of claim 1, further comprising:
the barrel, the motive source, the hopper, the gravimetric feeder, the feeder lift mechanism, the docking station, the bowl container and the container lift mechanism are all separate modules of the apparatus that can be disassembled from the apparatus as separate modules and packed in a standard shipping container for shipping.

9. A plastic extrusion apparatus comprising:
a barrel containing a drive screw, the barrel having a length with opposite proximal and distal ends;
a motive source operatively connected to the barrel proximal end for rotating the drive screw in the barrel in response to operation of the motive source;
a die head at the barrel distal end;
at least one hopper removably attached to the barrel adjacent the barrel proximal end, the hopper having an interior volume, a top opening to the interior volume and a cover plate that is removably attached over the top opening;
at least two separate and substantially identical gravimetric feeders, each gravimetric feeder being interchangeably and removably attachable to the hopper, each gravimetric feeder having a housing and an outlet tube projecting from the housing, each housing being mounted on and supported by a cart by a pivot connection between the housing and the cart that allows the housing to be manually pivoted about an axis relative to the cart, and each cart having a plurality of wheels that enable the cart and the supported housing to be manually portable relative to the hopper;
a feeder lift mechanism adjacent the hopper, the feeder lift mechanism being constructed to interchangeably engage with one of the two gravimetric feeders that has been manually moved to a position adjacent the lift mechanism, raise the engaged gravimetric feeder to a raised position of the gravimetric feeder relative to the hopper, and lower the raised gravimetric feeder to a lowered position of the gravimetric feeder relative to the hopper where the lowered gravimetric feeder can be manually moved and disengaged from the lift mechanism;
a docking station above the hopper and the lift mechanism, the docking station having a discharge tube that extends downwardly from the docking station and communicates with the gravimetric feeder raised to the raised position by the lift mechanism;
at least one bowl container in the docking station, the bowl container having a top opening and an opposite bottom opening with a valve at the bottom opening that is selectively controlled to be opened and closed; and
a container lift mechanism adjacent the hopper, the feeder lift mechanism and the docking station, the container lift mechanism being constructed to raise the bowl container to a raised position of the bowl container relative to the docking station and horizontally move the bowl container into the docking station to a position where the bowl container bottom opening is communicated with the docking station discharge tube.

10. The apparatus of claim 9, further comprising:
the at least one hopper being one of at least two separate and substantially identical hoppers, each hopper being interchangeably and removably attachable to the barrel adjacent the barrel proximal end by a plurality of manually operable claims, each hopper having an interior volume, each hopper having a top opening to the interior volume and a cover plate that is removably attached over the top opening by a plurality of manually operable clamps.

11. The apparatus of claim 9, further comprising:
at least two separate and substantially identical tubular sleeves, each sleeve being interchangeably and removably manually insertable inside the discharge tube of the docking station.

12. The apparatus of claim 9, further comprising:
the at least one bowl container being one of at least two separate and substantially identical bowl containers, each bowl container being interchangeably and removably receivable in the docking station, each bowl container having a top opening and an opposite bottom opening with a valve at the bottom opening that is selectively controlled to be opened and closed, each bowl container being mounted on and supported by a cart having a plurality of wheels that enable the cart and the supported bowl container to be manually portable relative to the hopper.

13. The apparatus of claim 12, further comprising:
the container lift mechanism being constructed to interchangeably engage with one of the two bowl containers that has been manually moved to a position adjacent the container lift mechanism, vertically raise the engaged bowl container to a raised position of the bowl container relative to the docking station, horizontally move the engaged bowl container into the docketing station to a position where the engaged bowl container bottom opening is communicated with the docking station discharge tube.

14. The apparatus of claim 9, further comprising:
the docking station having a valve actuator on the docking station and the valve actuator is operatively connected with the bowl container valve and is manually operable to selectively open and close the bowl container valve when the bowl container is moved into the docking station.

15. The apparatus of claim 9, further comprising:
the barrel, the motive source, the hopper, the gravimetric feeders, the feeder lift mechanism, the docking station, the bowl container and the container lift mechanism are all separate modules of the apparatus that can be disassembled from the apparatus as separate modules and packed in a standard shipping container for shipping.

16. A plastic extrusion apparatus comprising:
a barrel containing a drive screw, the barrel having a length with opposite proximal and distal ends;
a motive source operatively connected to the barrel proximal end for rotating the drive screw in the barrel in response to operation of the motive source;
a die head at the barrel distal end;
at least two separate and substantially identical hoppers, each hopper being interchangeably and removably attachable to the barrel adjacent the barrel proximal end, each hopper having an interior volume, each hopper having a top opening to the interior volume and a cover plate that is removably attached over the top opening;
at least one gravimetric feeder having a housing and an outlet tube projecting from the housing, the outlet tube being interchangeably and removably attachable to each hopper;
a feeder lift mechanism adjacent the hopper attached to the barrel, the feeder lift mechanism being constructed to raise the gravimetric feeder to a raised position of the gravimetric feeder relative to the hopper attached to the barrel, and lower the raised gravimetric feeder to a lowered position of the gravimetric feeder relative to the hopper attached to the barrel;
a docking station above the hopper attached to the barrel and the feeder lift mechanism, the docking station having a discharge tube that extends downwardly from the docking station and communicates with the gravimetric feeder raised to the raised position by the feeder lift mechanism;
at least one bowl container in the docking station, the bowl container having a top opening and an opposite bottom opening with a valve at the bottom opening that is selectively controlled to be opened and closed; and
a container lift mechanism adjacent the hopper attached to the barrel, the feeder lift mechanism and the docking station, the container lift mechanism being constructed to raise the bowl container to a raised position of the bowl container relative to the docking station, and horizontally move the bowl container into the docking station to a position where the bowl container bottom opening is communicated with the docking station discharge tube.

17. The apparatus of claim 16, further comprising:
the gravimetric feeder housing being mounted on and supported by a cart by a pivot connection between the gravimetric feeder housing and the cart, the pivot connection allowing the housing to be manually pivoted about an axis relative to the cart, and the cart having a plurality of wheels that enable the cart and the supported housing to be manually portable on the cart wheels relative to the hopper attached to the barrel.

18. The apparatus of claim 17, further comprising:
the gravimetric feeder being one of at least two separate and substantially identical gravimetric feeders, each feeder being interchangeably and removably attachable to the hopper attached to the barrel;
the feeder lift mechanism being constructed to interchangeably engage with one of the two gravimetric feeders that is manually moved to a position adjacent the lift mechanism, raise the engaged gravimetric feeder to a raised position of the gravimetric feeder relative to the hopper attached to the barrel, and lower the raised gravimetric feeder to a lowered position of the gravimetric feeder relative to the hopper attached to the barrel where the lowered gravimetric feeder can be manually moved and disengaged from the lift mechanism.

19. The apparatus of claim 16, further comprising:
the bowl container being mounted on and supported by a cart having a plurality of wheels that enable the cart and the supported bowl container to be manually portable relative to the hopper attached to the barrel.

20. The apparatus of claim 19 further comprising:
the bowl container being one of at least two separate and substantially identical bowl containers, each bowl container being interchangeable and removably receivable in the docking station.

21. The apparatus of claim 16, further comprising:
at least two separate and substantially identical tubular sleeves, each sleeve being interchangeably and removably manually insertable inside the discharge tube of the docking station.

22. The apparatus of claim 16, further comprising:
the barrel, the motive source, the hoppers, the gravimetric feeder, the feeder lift mechanism, the docking station, the bowl container and the container lift mechanism are all separate modules of the apparatus that can be disassembled from the apparatus as separate modules and packed in a standard shipping container for shipping.

23. A plastic extrusion apparatus comprising:
a barrel containing a drive screw, the barrel having a length with opposite proximal and distal ends;
a motive source operatively connected to the barrel proximal end for rotating the drive screw in the barrel in response to operation of the motive source;
a die head at the barrel distal end;
at least one hopper attached to the barrel adjacent the barrel proximal end, the hopper having an interior volume, a top opening to the interior volume and a cover plate removably attached over the top opening;
at least one gravimetric feeder attached to the hopper, the gravimetric feeder having a housing with an interior volume and an outlet tube projecting from the housing, the outlet tube being removably attached to the hopper;
a feeder lift mechanism adjacent the hopper, the feeder lift mechanism being constructed to raise the gravimetric feeder to a raised position of the gravimetric feeder relative to the hopper, and to lower the raised gravimetric feeder to a lowered position of the gravimetric feeder relative to the hopper;
a docking station above the hopper and the feeder lift mechanism, the docking station having a discharge tube that extends downwardly from the docking station and communicates with the gravimetric feeder raised to the raised position by the feeder lift mechanism;
at least two separate and substantially identical bowl containers, each bowl container being interchangeably and removably receivable in the docking station, each bowl container having a top opening and an opposite bottom opening with a valve at the bottom opening that is selectively controlled to be opened and closed, each bowl container being mounted on and supported by a cart having a plurality of wheels that enable the cart and the supported bowl container to be manually portable relative to the hopper; and
a container lift mechanism adjacent the hopper, the feeder lift mechanism and the docking station, the container lift mechanism being constructed to interchangeably engage with one of the two bowl containers that has been manually moved to a position adjacent the container lift mechanism, to vertically raise the engaged bowl container to a raised position of the bowl container relative to the docking station, and to horizontally move the engaged bowl container into the docking station to a position where the bowl container bottom opening is communicated with the docking station discharge tube.

24. The apparatus of claim 23, further comprising:
the gravimetric feeder housing is mounted on and supported by a cart by a pivot connection between the housing and the cart, the pivot connection allowing the housing to be manually pivoted about an axis relative to the cart, and the cart having a plurality of wheels that enable the cart and the supported housing to be manually portable on the cart wheels relative to the hopper.

25. The apparatus of claim 24, further comprising:
the gravimetric feeder being one of at least two separate and substantially identical gravimetric feeders, each gravimetric feeder being interchangeably and removably attachable to the hopper, each gravimetric feeder having a housing, each housing being mounted on and supported by a cart by a pivot connection between the cart and the housing, the pivot connection allowing the housing to be manually pivoted about an axis relative to the cart, and each cart having a plurality of wheels that enable each cart and the supported housing to be manually portable on the cart wheels relative to the hopper.

26. The apparatus of claim 23, further comprising:
at least two separate and substantially identical tubular sleeves, each sleeve being interchangeably and removably manually insertable inside the discharge tube of the docking station.

27. The apparatus of claim 23, further comprising:
the hopper being one of at least two separate and substantially identical hoppers, each hopper being interchangeably and removably attachable to the barrel adjacent the barrel proximal end.

28. The apparatus of claim 23, further comprising:
the barrel, the motive source, the hopper, the gravimetric feeder, the feeder lift mechanism, the docking station, the bowl containers and the container lift mechanism are all separate modules of the apparatus that can be disassembled from the apparatus as separate modules and packed in a standard shipping container for shipping.

* * * * *